(12) United States Patent
Sakurai

(10) Patent No.: US 11,776,325 B2
(45) Date of Patent: Oct. 3, 2023

(54) INFORMATION MANAGEMENT DEVICE OF WORK MACHINE, INFORMATION MANAGEMENT METHOD, AND INFORMATION MANAGEMENT SYSTEM

(71) Applicant: Komatsu Ltd., Tokyo (JP)

(72) Inventor: Kenichi Sakurai, Tokyo (JP)

(73) Assignee: Komatsu Ltd., Tokyo (JP)

( * ) Notice: Subject to any disclaimer, the term of this patent is extended or adjusted under 35 U.S.C. 154(b) by 476 days.

(21) Appl. No.: 16/968,949

(22) PCT Filed: Mar. 18, 2019

(86) PCT No.: PCT/JP2019/011289
§ 371 (c)(1),
(2) Date: Aug. 11, 2020

(87) PCT Pub. No.: WO2019/188529
PCT Pub. Date: Oct. 3, 2019

(65) Prior Publication Data
US 2021/0056772 A1     Feb. 25, 2021

(30) Foreign Application Priority Data

Mar. 29, 2018    (JP) ................................. 2018-065885

(51) Int. Cl.
    *G05D 1/00*          (2006.01)
    *G07C 5/00*          (2006.01)
    (Continued)

(52) U.S. Cl.
    CPC ........... *G07C 5/008* (2013.01); *G05D 1/0027* (2013.01); *G05D 1/0212* (2013.01);
    (Continued)

(58) Field of Classification Search
CPC .... G07C 5/008; G07C 5/0808; G07C 5/0816; G07C 5/0841; G07C 5/00; G05D 1/0027;
(Continued)

(56) References Cited

U.S. PATENT DOCUMENTS 7,124,056 B2   10/2006   Shibamori et al.
8,996,229 B2    3/2015   Shin
(Continued)

FOREIGN PATENT DOCUMENTS

CN     102265301 A     11/2011
CN     105518554 A      4/2016
(Continued)

OTHER PUBLICATIONS

Marcin Szpyrka, Bartosz Jasiul, Konrad Wrona, and Filip Dziedzic, Telecommunications Networks Risk Assessment with Bayesian Networks. In: Computer Information Systems and Industrial Management, Sep. 2013, Springer, Berlin, Heidelberg, p. 278-279 (Year: 2013).*

(Continued)

*Primary Examiner* — Yonel Beaulieu
(74) *Attorney, Agent, or Firm* — Locke Lord LLP

(57) ABSTRACT

An information management device of a work machine includes an information collection unit that collects vehicle information of the work machine, an information analysis unit that analyzes the vehicle information to generate analysis information, a selection definition storage unit that stores a selection definition that defines transmission propriety information indicating whether it is allowed to transmit the vehicle information and the analysis information to a general-purpose processing function unit, and an information selection unit that selects, based on the selection definition, information to be transmitted to the general-purpose processing function unit.

8 Claims, 13 Drawing Sheets

(51) Int. Cl.
  *G05D 1/02* (2020.01)
  *G07C 5/08* (2006.01)
(52) U.S. Cl.
  CPC ......... *G07C 5/0808* (2013.01); *G07C 5/0816* (2013.01); *G05D 2201/0202* (2013.01)
(58) Field of Classification Search
  CPC ......... G05D 1/0212; G05D 2201/0202; G05D 1/00; E02F 9/20; G06Q 10/00; G06Q 50/02; G06Q 50/08
  See application file for complete search history.

(56) References Cited

U.S. PATENT DOCUMENTS

| | | | |
|---|---|---|---|
| 10,165,053 | B2 | 12/2018 | Fujiwara et al. |
| 10,229,546 | B2 | 3/2019 | Murata et al. |
| 2004/0034511 | A1* | 2/2004 | Shibamori ............. G07C 5/008 702/188 |
| 2005/0021245 | A1 | 1/2005 | Furuno et al. |
| 2007/0101017 | A1* | 5/2007 | Dawson ................ H04L 67/125 709/238 |
| 2011/0257831 | A1 | 10/2011 | Shin |
| 2016/0226977 | A1 | 8/2016 | Fujiwara et al. |

FOREIGN PATENT DOCUMENTS

| | | |
|---|---|---|
| JP | 2004-21286 A | 1/2004 |
| JP | 2016-76854 A | 5/2016 |
| JP | 2017-045282 A | 3/2017 |
| WO | 02/08527 A1 | 1/2002 |

OTHER PUBLICATIONS

International Search Report dated May 28, 2019, issued for PCT/JP2019/011289.

Office Action dated May 30, 2022, issued for the corresponding Australian patent application No. 2019245096.

* cited by examiner

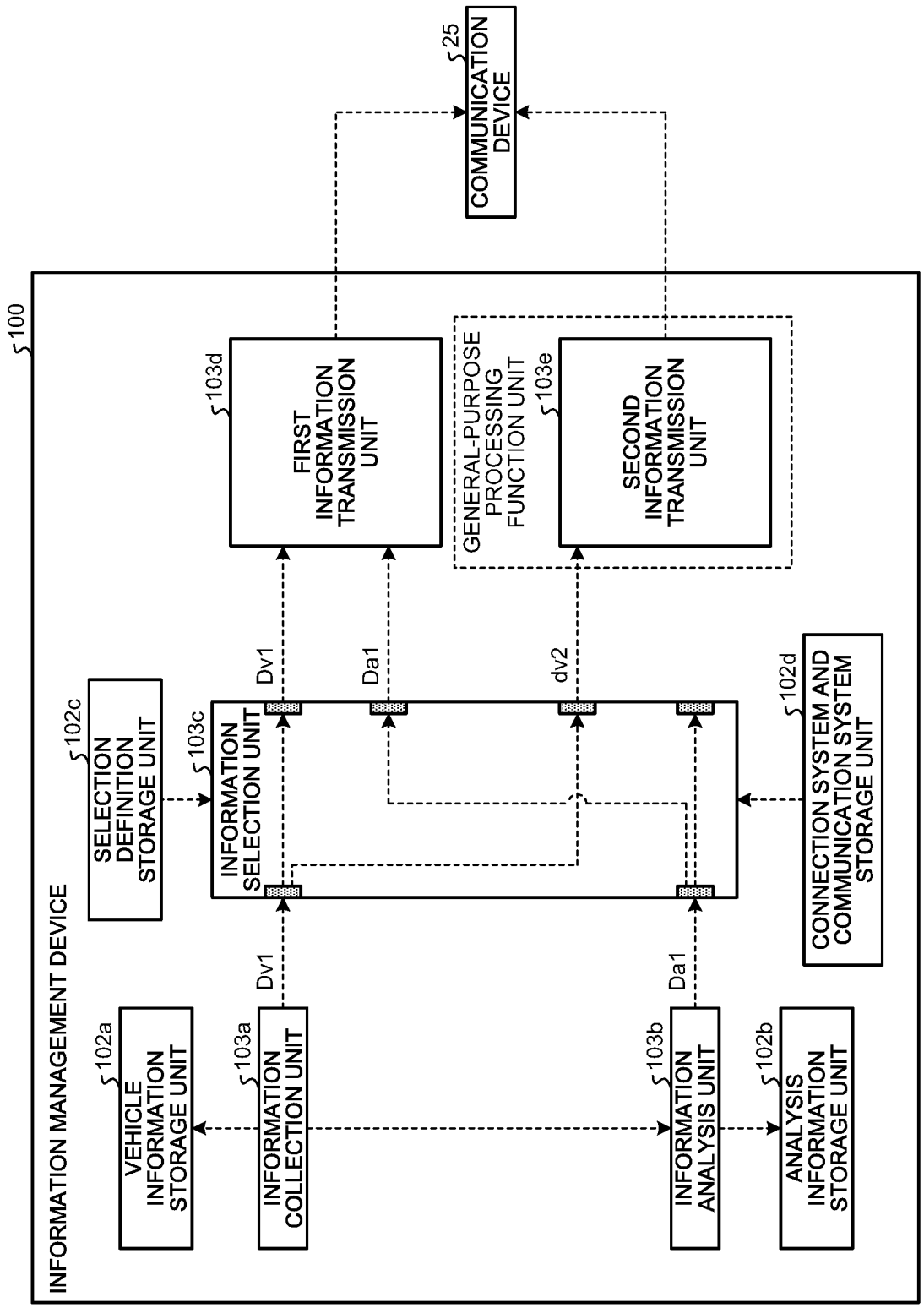

FIG.4

| TRANSMISSION DESTINATION | VEHICLE INFORMATION TYPE ID | PROPRIETY OF TRANSMISSION (VEHICLE INFORMATION) | ANALYSIS INFORMATION TYPE ID | PROPRIETY OF TRANSMISSION (ANALYSIS INFORMATION) |
|---|---|---|---|---|
| FIRST INFORMATION TRANSMISSION UNIT 103d | D001 | TRANSMISSION ALLOWED | D101 | TRANSMISSION ALLOWED |
| | D002 | | D102 | |
| | ⋮ | | ⋮ | |
| | D011 | | D111 | |
| | D012 | | D112 | |
| | ⋮ | | ⋮ | |
| SECOND INFORMATION TRANSMISSION UNIT 103e | D001 | TRANSMISSION ALLOWED | D101 | TRANSMISSION NOT ALLOWED |
| | D002 | TRANSMISSION NOT ALLOWED | D102 | |
| | ⋮ | ⋮ | ⋮ | |
| | D011 | TRANSMISSION ALLOWED | D111 | |
| | D012 | TRANSMISSION NOT ALLOWED | D112 | |
| | ⋮ | ⋮ | ⋮ | |

FIG.5

| CONNECTION DESTINATION | CONNECTION SYSTEM | COMMUNICATION SYSTEM |
|---|---|---|
| FIRST INFORMATION TRANSMISSION UNIT 103d | FIRST CONNECTION SYSTEM | FIRST COMMUNICATION SYSTEM |
| SECOND INFORMATION TRANSMISSION UNIT 103e | SECOND CONNECTION SYSTEM | SECOND COMMUNICATION SYSTEM |

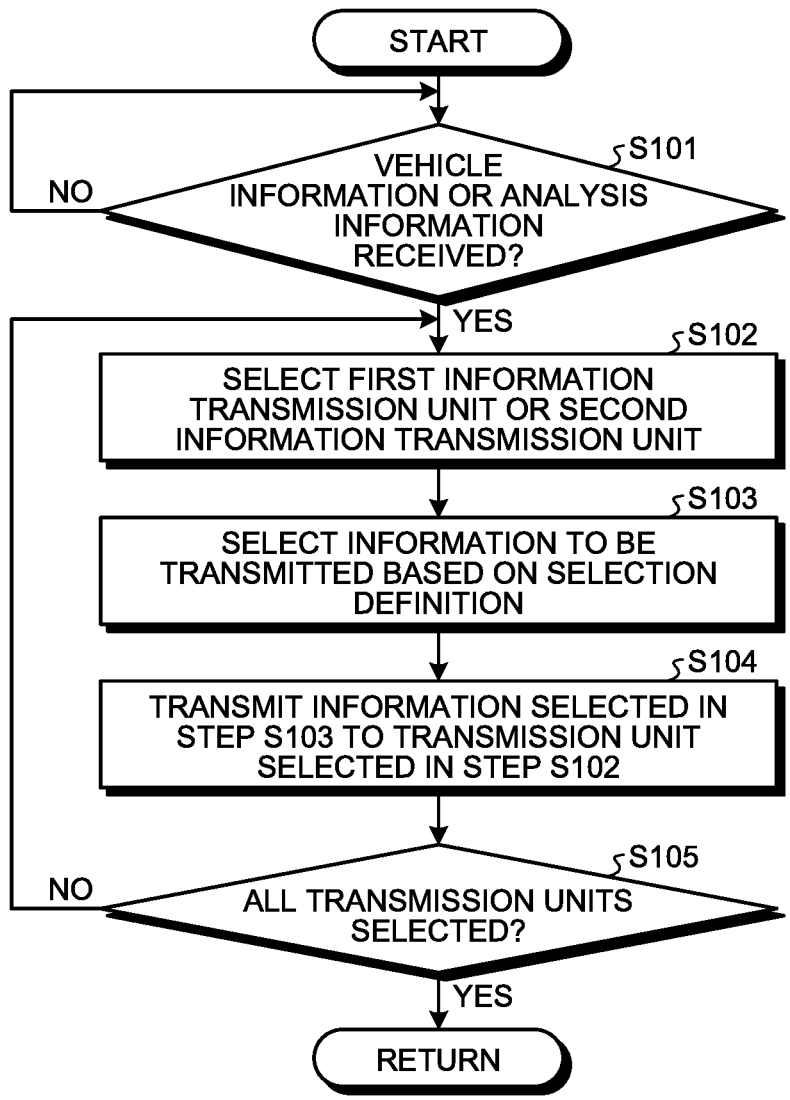

FIG.8

| TRANSMISSION DESTINATION | VEHICLE INFORMATION TYPE ID | PROPRIETY OF TRANSMISSION (VEHICLE INFORMATION) | FIRST ANALYSIS INFORMATION TYPE ID | PROPRIETY OF TRANSMISSION (FIRST ANALYSIS INFORMATION) | SECOND ANALYSIS INFORMATION TYPE ID | PROPRIETY OF TRANSMISSION (SECOND ANALYSIS INFORMATION) |
|---|---|---|---|---|---|---|
| FIRST INFORMATION TRANSMISSION UNIT 113d | D001<br>D002<br>...<br>D011<br>D012<br>... | TRANSMISSION ALLOWED | D101<br>D102<br>...<br>D111<br>D112<br>... | TRANSMISSION ALLOWED | D201<br>D202<br>...<br>D211<br>D212<br>... | TRANSMISSION ALLOWED |
| SECOND INFORMATION TRANSMISSION UNIT 113e | D001<br>D002<br>...<br>D011<br>D012<br>... | TRANSMISSION NOT ALLOWED | D101<br>D102<br>...<br>D111<br>D112<br>... | TRANSMISSION NOT ALLOWED | D201<br>D202<br>...<br>D211<br>D212<br>... | TRANSMISSION ALLOWED |
| SECOND INFORMATION ANALYSIS UNIT 113f | D001<br>D002<br>...<br>D011<br>D012<br>... | TRANSMISSION ALLOWED | D101<br>D102<br>...<br>D111<br>D112<br>... | TRANSMISSION NOT ALLOWED | — | — |

| CONNECTION DESTINATION | CONNECTION SYSTEM | COMMUNICATION SYSTEM |
|---|---|---|
| FIRST INFORMATION TRANSMISSION UNIT 113d | FIRST CONNECTION SYSTEM | FIRST COMMUNICATION SYSTEM |
| SECOND INFORMATION TRANSMISSION UNIT 113e | SECOND CONNECTION SYSTEM | SECOND COMMUNICATION SYSTEM |
| SECOND INFORMATION ANALYSIS UNIT 113f | THIRD CONNECTION SYSTEM | THIRD COMMUNICATION SYSTEM |

FIG.13

| VEHICLE INFORMATION ID | PRIORITY | ERROR INFORMATION |
|---|---|---|
| D001 | P1 | NONE |
| D002 | P2 | NONE |
| ⋮ | ⋮ | ⋮ |
| D011 | P3 | NONE |
| D012 | P1 | NONE |
| ⋮ | ⋮ | ⋮ |

FIG.14

| ANALYSIS INFORMATION ID | PRIORITY | ERROR INFORMATION |
|---|---|---|
| D101 | P1 | NONE |
| D002 | P2 | NONE |
| ⋮ | ⋮ | ⋮ |
| D111 | P3 | NONE |
| D112 | P1 | NONE |
| ⋮ | ⋮ | ⋮ |

| EXCEPTION PROCESS EXECUTION MATTER | EXCEPTION PROCESS CONTENT |
|---|---|
| RECEIVE VEHICLE INFORMATION OR ANALYSIS INFORMATION INCLUDING ERROR INFORMATION OR PRIORITY INFORMATION | PERFORM SELECTION ACCORDING TO SELECTION DEFINITION WHEN RECEIVING VEHICLE INFORMATION OR ANALYSIS INFORMATION INCLUDING ERROR INFORMATION OR PRIORITY INFORMATION |

# INFORMATION MANAGEMENT DEVICE OF WORK MACHINE, INFORMATION MANAGEMENT METHOD, AND INFORMATION MANAGEMENT SYSTEM

FIELD

The present invention relates to an information management device of a work machine, an information management method, and an information management system.

BACKGROUND

An information management device is mounted on a work machine for the purpose of the efficient operation, the maintenance and inspection, and the like of the work machine operating at a construction site, a mine or the like. The information management device records the operation information collected from the sensors and other control units provided with the work machine, and the processing information obtained by analyzing the collected operation information, and performing the process on the analyzed information, and transmits the operation information and the processing information recorded by the information management device to the outside of the work machine. With respect to the transmission of operation information and processing information recorded by the information management device to the outside of the work machine, various transmission methods have been proposed, such as a method in which even when the transmission of the recorded operation information and processing information is interrupted, the transmission can be restarted from the interruption point.

CITATION LIST

Patent Literature

Patent Literature 1: JP 2017-45282 A

SUMMARY

Technical Problem

In response to the increasing demand for recording and transmitting the vehicle information and the analysis information of the information management device, it is possible to add the transmission and analysis functions of the information management device by newly adding, to an information management device, a function unit provided by an administrator of the information management device or a service provider other than the administrator, or an external device.

However, even when new information is allowed to be transmitted and analyzed, the vehicle information and the analysis information recorded and transmitted by the information management device are required to be efficiently operated, maintained and inspected. Due to the above circumstances, the administrator of the information management device has to manage the provision of the vehicle information and the analysis information to the function unit, the device of a service provider other than the administrator, and users.

An object of the present invention is to control the provision of information based on the purpose of the administrator of the information management device, the characteristics of the network, and the position of the service user of the device to which information is provided when a function or a device is newly mounted on the work machine.

Solution to Problem

According to an aspect of the present invention, an information management device of a work machine, the information management device comprises: an information collection unit that collects vehicle information of the work machine; an information analysis unit that analyzes the vehicle information to generate analysis information; a selection definition storage unit that stores a selection definition that defines transmission propriety information indicating whether it is allowed to transmit the vehicle information and the analysis information to a general-purpose processing function unit; and an information selection unit that selects, based on the selection definition, information to be transmitted to the general-purpose processing function unit.

Advantageous Effects of Invention

According to the invention, it is possible to control the provision of information based on the purpose of the administrator of the information management device, the characteristics of the network, and the position of the service user of the device to which information is provided when a function or a device is newly mounted on the work machine.

BRIEF DESCRIPTION OF DRAWINGS

FIG. 3 is a block diagram illustrating a functional configuration example of an information management device according to a first embodiment.

FIG. 4 is a diagram illustrating a configuration example of a selection definition stored in a selection definition storage unit according to the first embodiment.

FIG. 5 is a diagram illustrating an example of a connection system and a communication system stored in a connection system and communication system storage unit according to the first embodiment.

FIG. 6 is a flowchart illustrating an example of processing by the information management device according to the first embodiment.

FIG. 8 is a diagram illustrating a configuration example of a selection definition stored in a selection definition storage unit according to the second embodiment.

FIG. 13 is a diagram illustrating an example of information stored in a vehicle information storage unit according to the third embodiment.

FIG. 14 is a diagram illustrating an example of information stored in an analysis information storage unit according to the third embodiment.

DESCRIPTION OF EMBODIMENTS

Hereinafter, embodiments of the present invention will be described with reference to the drawings, but the present invention is not limited thereto. The constituent elements of the respective embodiments described below can be appropriately combined. In some cases, some components are not used.

First Embodiment

<Information Management System>

Figure 1:
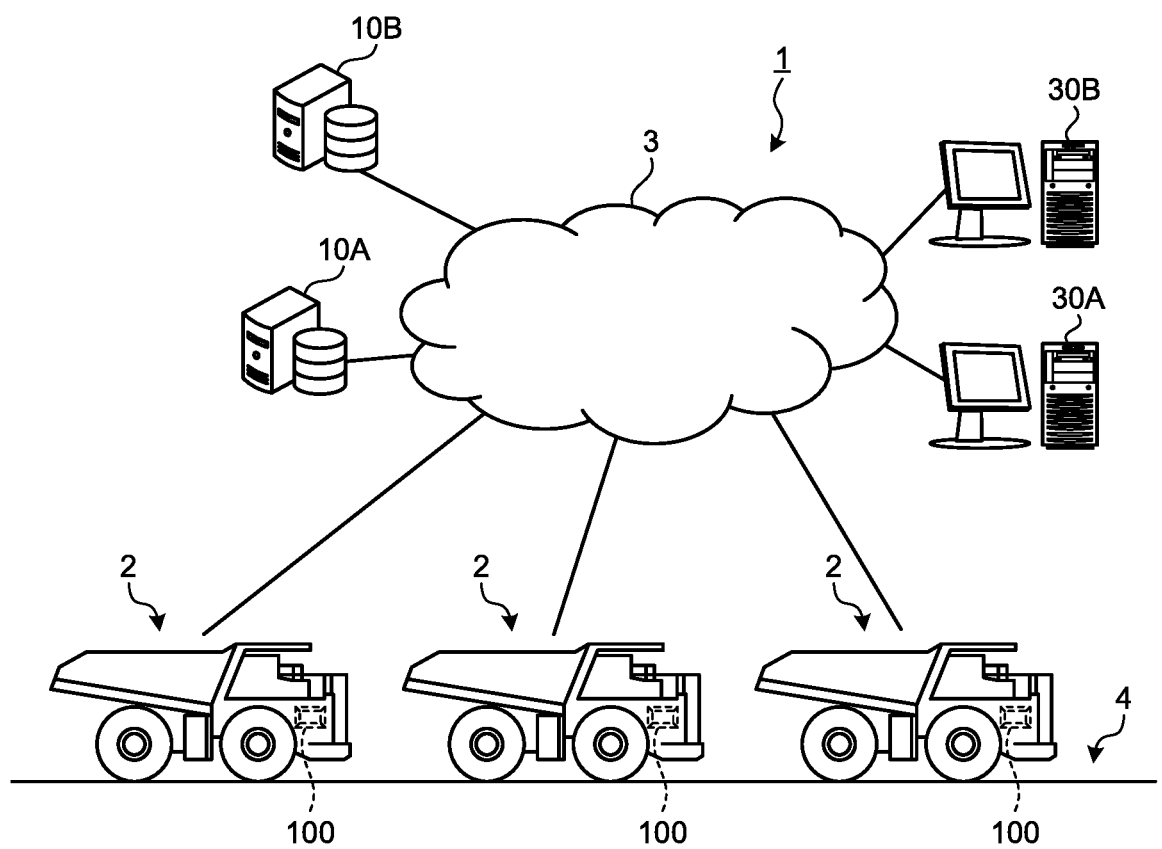
FIG. 1 is a diagram schematically illustrating an example of an information management system according to an embodiment.

FIG. 1 is a diagram schematically illustrating an example of an information management system 1 according to the embodiment. In the embodiment described below, a dump truck is exemplified as the work machine, but the following embodiments can be similarly applied to other work machine such as a shovel car, a bulldozer, a wheel loader, and a forklift.

The information management system 1 manages vehicle information regarding operation states of a plurality of dump trucks 2 that is a work machine, and analysis information obtained by analyzing the vehicle information.

The dump truck 2 is the work machine for carrying loads and the like. The dump truck 2 includes a traveling body, a main body attached to the upper portion of the traveling body, and a stowage unit such as a vessel attached to the main body. The stowage unit corresponds to the working equipment. The dump truck 2 operates a prime mover such as an engine mounted on the main body, and drives a traveling body and a pump. With hydraulic oil supplied from a pump, one end and the other end of the hydraulic cylinder are attached to the main body and the stowage unit, respectively. By driving the hydraulic cylinder, the stowage unit is moved up and down by the operation of the hydraulic cylinder. The dump truck 2 can be operated at a work site 4, for example. The dump truck 2 is equipped with an information management device 100 that records the vehicle information and the analysis information obtained by analyzing the vehicle information. The dump truck 2 may be a manned vehicle in which operations such as traveling, stopping, and loading/unloading of luggage are performed by a driver, or may be an unmanned dump truck whose traveling is controlled by remote control and autonomous traveling.

The information management system 1 includes a server 10A, a server 10B, an information processing device 30A, an information processing device 30B, and the information management device 100. The server 10A and the server 10B, the information processing device 30A and the information processing device 30B, and the information management device 100 can be arbitrarily connected to each other via a communication network 3 in a communicable state. As the communication network 3, at least one of a local area network (LAN), the Internet, a mobile phone communication network, and a satellite communication network is exemplified.

The information management device 100 is mounted on the dump truck 2. The information management device 100 can collect the vehicle information of the dump truck 2 and record the collected vehicle information and the analysis information obtained by analyzing the vehicle information. The information management device 100 can transmit the recorded the vehicle information and the analysis information to the server 10A and the server 10B as necessary. The information management device 100 can be realized by, for example, an in-vehicle controller that manages the vehicle information and the analysis information of the dump truck 2.

The server 10A and the server 10B can store at least part of the vehicle information and the analysis information recorded by the information management device 100. The server 10A can provide at least part of the vehicle information and the analysis information to the information processing device 30A in response to a request from the information processing device 30A, for example. The server 10B can provide at least part of the vehicle information and the analysis information to the information processing device 30B in response to a request from the information processing device 30B, for example. Each of the server 10A and the server 10B has an information storage function as a storage and an information processing function as a computer system. As a preferable example, it is conceivable that the server 10A may be a device managed by the administrator, who, for example, manufactures, sells and provides services for the work machine, of the information management device 100 where the administrator sets the information management device 100 and the like included in the dump truck 2, or provides the collected information to a service person as information for determining the necessity of maintenance, and the server 10B may be a device managed by a service provider other than the administrator, of the information management device 100, who manufactures, sells and provides services for the work machine.

The information processing device 30A can receive at least part of the vehicle information and the analysis information provided from the server 10A, for example. The information processing device 30B can receive at least part of the vehicle information and the analysis information provided from the server 10B, for example. The information processing devices 30A and 30B each have an information processing function as a computer system. As a preferable example, it is conceivable that the information processing device 30A may be a device used by the administrator of the information management device 100 described above, and the information processing device 30B may be a device used by a service user provided by the above service provider.

<Information Management Device>

Figure 2:
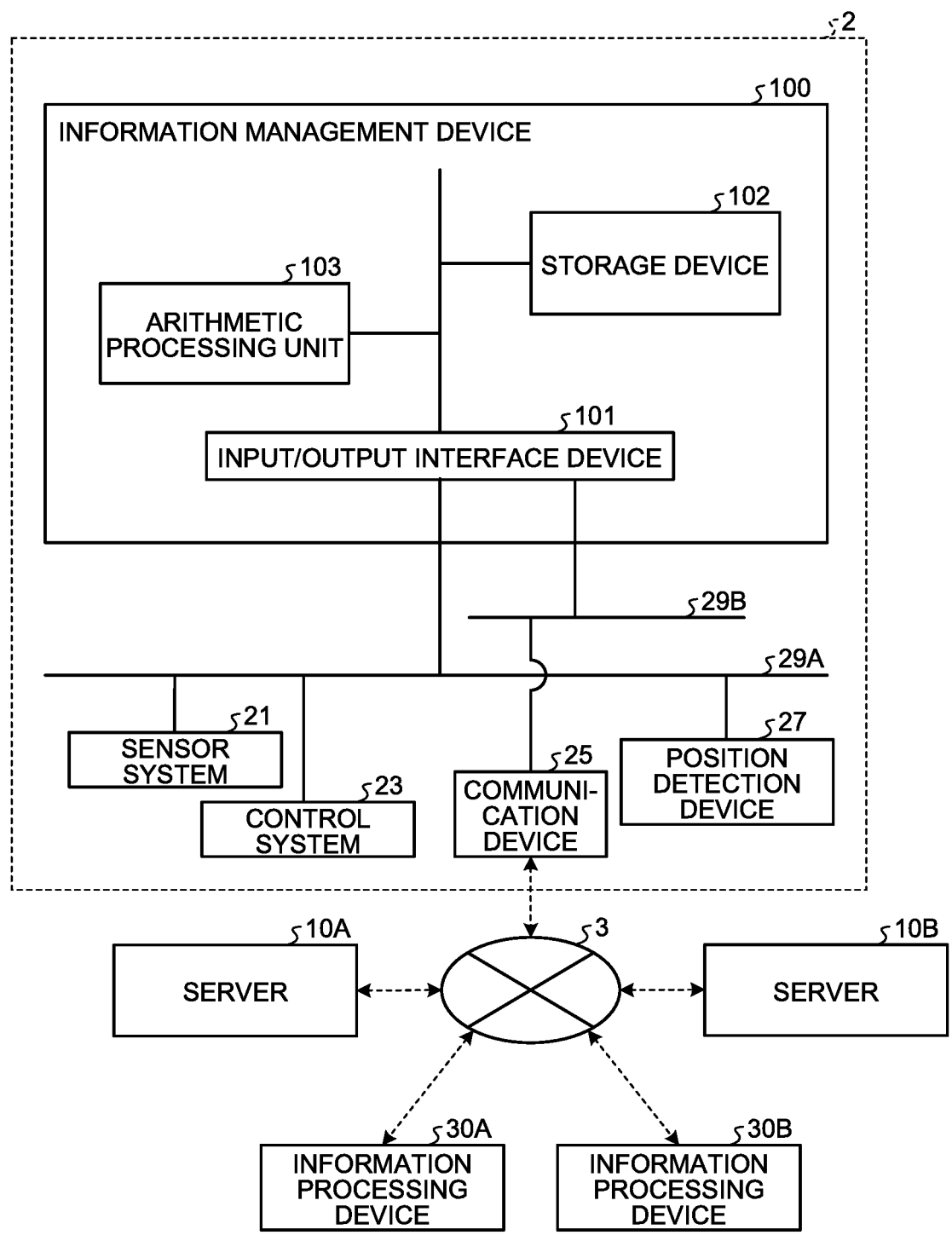
FIG. 2 is a schematic diagram illustrating a configuration example of a dump truck according to the embodiment.

FIG. 2 is a schematic diagram illustrating a configuration example of the dump truck 2 according to the embodiment.

The dump truck 2 includes a sensor system 21, a control system 23, a communication device 25, a position detection device 27, and the information management device 100. The information management device 100 can perform data communication with the sensor system 21, the control system 23, and the position detection device 27 via a communication line 29A. The information management device 100 can perform data communication with the communication device 25 via a communication line 29B. The communication line 29A and the communication line 29B can be constructed to support communication standards such as a local interconnect network (LIN), and FlevRay in addition to Ethernet (registered trademark), a controller area network (CAN) standardized as ISO11898 and ISO11519.

The sensor system 21 has a plurality of sensors that detect vehicle information, which is various data regarding the dump truck 2. The sensor system 21 includes, for example, a sensor that detects the traveling speed of the dump truck 2, a sensor that detects the acceleration of the dump truck 2, a sensor that detects the engine water temperature of the dump truck 2, and a fuel consumption amount of the dump truck 2. The vehicle information detected by the sensor system 21 includes the traveling speed and acceleration of the dump truck 2, the water temperature of the engine, the fuel consumption, the information on the steering wheel operation, the pressure of the hydraulic cylinder driving the vessel of the dump truck 2, and the like. The sensor system 21 can transmit the vehicle information to the information management device 100 via the communication line 29A. The sensor system 21 and the information management device 100 can perform data communication via the communication line 29A.

The control system 23 has a device including a plurality of controllers that control the dump truck 2. The control system 23 includes a controller that controls the engine of the dump truck 2, a controller that controls the traveling state of the dump truck 2, a controller that controls the hydraulic pressure at various places in the dump truck 2, and the like. The vehicle information, which is various data used for controlling the dump truck 2 in the control system 23, includes the time measured by the time measuring function installed in the controller. The control system 23 can transmit the vehicle information to the information management device 100 via the communication line 29A. In addition, when the dump truck 2 is a manned vehicle, the control system 23 may transmit the data regarding the personal information of the worker who gets on the dump truck 2 to the information management device 100. The control system 23 and the information management device 100 can perform data communication via the communication line 29A.

The communication device 25 can perform data communication with the information management device 100 via the communication line 29B. The communication device 25 can perform data communication with the information management device 100, the server 10A, and the server 10B via the communication network 3.

The position detection device 27 can detect an absolute position indicating the position of the dump truck 2 in the global coordinate system by a global navigation satellite system (GNSS). The position detection device 27 can transmit the detected information relating to the position of the dump truck 2 to the control system 23 and the information management device 100 via the communication line 29A. The information relating to the position of the dump truck 2 detected by the position detection device 27 is vehicle information. The global navigation satellite system includes other positioning systems such as a global positioning system (GPS).

The information management device 100 includes an input/output interface device 101, a storage device 102, and an arithmetic processing unit 103. The information management device 100 may include a converter capable of mutually converting an analog signal and a digital value, a clock for clocking, and the like, when necessary.

The input/output interface device 101 can receive data input/output and control data communication performed between the storage device 102 and the arithmetic processing unit 103. The input/output interface device 101 can control data communication performed between the sensor system 21, the control system 23, the position detection device 27, and the information management device 100 via the communication line 29A. The communication line 29A is used only for data communication inside the dump truck 2, and is isolated from an open communication network constructed outside such as the communication network 3. The input/output interface device 101 can control the data communication performed between the communication device 25 and the information management device 100 via the communication line 29B. The communication line 29B is connected via the communication device 25 to an open communication network constructed outside such as the communication network 3. The functions of the input/output interface device 101 may be distributed into a function of controlling the data communication performed inside the information management device 100 and a function of controlling the data communication performed between the information management device 100 and the sensor system 21, the control system 23, the communication device 25, and the position detection device 27 which are peripheral devices of the information management device 100. The communication line 29A and the communication line 29B can be constructed by a wire harness, a connector and the like.

The storage device 102 can store a computer program that realizes the arithmetic processing executed by the arithmetic processing unit 103, data used for the arithmetic processing, and the like. The storage device 102 may include a storage device such as a read only memory (ROM), a random access memory (RAM), a hard disk drive (HDD), and a solid state drive (SSD), and a non-transitory storage medium.

The arithmetic processing unit 103 can execute various arithmetic processes according to a computer program stored in the storage device 102. The computer programs stored in the storage device 102 can provide functions for implementing various arithmetic processes performed by the arithmetic processing unit 103. The arithmetic processing unit 103 includes a microprocessor such as a central processing unit (CPU).

FIG. 3 is a block diagram illustrating a functional configuration example of the information management device 100 according to the first embodiment.

The information management device 100 includes a vehicle information storage unit 102a, an analysis information storage unit 102b, a selection definition storage unit 102c, a connection system and communication system storage unit 102d, an information collection unit 103a, an information analysis unit 103b, an information selection unit 103c, a first information transmission unit 103d, and a second information transmission unit 103e.

The vehicle information storage unit 102a, the analysis information storage unit 102b, the selection definition storage unit 102c, and the connection system and communication system storage unit 102d are included in the storage area of the storage device 102, for example. The information collection unit 103a, the information analysis unit 103b, the information selection unit 103c, the first information transmission unit 103d, and the second information transmission unit 103e are included in various arithmetic processes performed by the arithmetic processing unit 103, for example.

The vehicle information storage unit 102a stores the vehicle information acquired from the sensor system 21, the control system 23, and the position detection device 27 as vehicle information in association with, for example, the date and time information when the information was acquired. The vehicle information is collected by the information collection unit 103a described later.

The analysis information storage unit 102b stores the analysis result of vehicle information as analysis information. The analysis information is generated by the information analysis unit 103b described later.

The selection definition storage unit 102c stores a selection definition that defines transmission propriety information indicating whether it is allowed to transmit the vehicle information and the analysis information to the second information transmission unit 103e. The transmission destination refers to the first information transmission unit 103d or the second information transmission unit 103e in the first embodiment. That is, the selection definition storage unit 102c stores, as a selection definition, a correspondence between the first information transmission unit 103d set as the transmission destination and the transmission propriety information indicating whether it is allowed to transmit the vehicle information and the analysis information to the first information transmission unit 103d, and a correspondence between the second information transmission unit 103e set as the transmission destination and the transmission propriety information indicating whether it is allowed to transmit the vehicle information and the analysis information to the second information transmission unit 103e.

FIG. 4 is a diagram illustrating a configuration example of a selection definition stored in the selection definition storage unit 102c according to the first embodiment. As illustrated in FIG. 4, the selection definition storage unit 102c stores, for example, a selection definition in which each item of a transmission destination, a vehicle information type identification (ID), a propriety of transmission of vehicle information, an analysis information type ID, and a propriety of transmission of analysis information is associated with each other.

In the item of the transmission destination, the transmission destination of the vehicle information and the analysis information transmitted from the information selection unit 103c is set. In the example illustrated in FIG. 4, the first information transmission unit 103d and the second information transmission unit 103e are set as the transmission destinations of the vehicle information and the analysis information.

In the item of the vehicle information type ID, when each piece of data of the vehicle information collected by the information collection unit 103a is classified according to the type, an identifier uniquely assigned to each piece of data is set. The vehicle information type ID is assigned by the information collection unit 103a. As an example, "D001" may be assigned by the information collection unit 103a as a unique identifier for water temperature data, which is vehicle information, and "D012" may be assigned by the information collection unit 103a as a unique identifier for data relating to engine control, which is vehicle information.

In the item of the propriety of transmission corresponding to the vehicle information, a value indicating whether it is allowed to transmit each piece of data included in the vehicle information is set for each transmission destination. In the example illustrated in FIG. 4, "transmission allowed" is set as the value indicating that transmission is allowed, and "transmission not allowed" is set as the value indicating that transmission is not allowed.

In the item of the analysis information type ID, when each piece of data of the analysis information generated by the information analysis unit 103b is classified according to the type, an identifier that is uniquely assigned to the category to which each piece of data belongs is set. The analysis information type ID is assigned by the information analysis unit 103b. As an example, for the category to which the analysis data relating to the water temperature data, which is the analysis information, belongs, "D101" may be assigned as a unique identifier by the information analysis unit 103b, and for the category to which the analysis data relating to engine control, which is analysis information, belongs, "D112" may be assigned as a unique identifier by the information analysis unit 103b.

In the item of the propriety of transmission corresponding to the analysis information, a value indicating whether it is allowed to transmit each piece of data included in the analysis information is set for each transmission destination. In the example illustrated in FIG. 4, "transmission allowed" is set as the value indicating that transmission is allowed, and "transmission not allowed" is set as the value indicating that transmission is not allowed.

According to the selection definition illustrated in FIG. 4, all of the vehicle information and the analysis information are transmitted from the information selection unit 103c to the first information transmission unit 103d. On the other hand, according to the selection definition illustrated in FIG. 4, part of the vehicle information is transmitted from the information selection unit 103c to the second information transmission unit 103e.

The selection definition is created in advance by the administrator of the information management device 100 based on the communication risk level or access right. The administrator can create the selection definition by any method. The administrator may directly operate the operation panel or the like of the dump truck 2 to create the selection definition, create a selection definition outside the dump truck 2 through connection with the system of the dump truck 2 via a physical interface such as a cable, or create the selection definition by remote control at a location remote from the dump truck 2 through connection with the system of the dump truck 2 via the communication network 3. The administrator may create the selection definition by setting whether it is possible to transmit the data contained in the vehicle information and the analysis information, that is, each ID unique to the data without being limited to the example in which the propriety of transmission for each of the vehicle information type ID and the analysis information ID is set and the selection definition is created. The selection definition may be not only created manually by the administrator, but also created automatically by the information management device 100 acquiring a creation tool for creating a selection definition from a server or the like disposed on the communication network 3 communicatively connected to the information management device 100, and using the acquired creation tool.

The communication risk level indicates, for example, the degree of a risk when the first information transmission unit 103d and the second information transmission unit 103e communicate with the outside of the information management device 100 via the communication network 3. For example, it is determined that the higher the possibility that communication content is intercepted, such as when communication is performed through a device whose communication content is not encrypted, the higher the degree of a risk when the first information transmission unit 103d and the second information transmission unit 103e communicate with the outside of the information management device 100. The communication risk level increases according to the degree of a communication risk. The administrator of the information management device 100 can set the content of the vehicle information and the analysis information to be transmitted from the first information transmission unit 103*d* and the second information transmission unit 103*e* to the outside according to the communication risk level. The higher the communication risk level, the more limited the content of the vehicle information and the analysis information to be transmitted from the first information transmission unit 103*d* and the second information transmission unit 103*e* to the outside.

The access right is assigned in advance in accordance with, for example, the job responsibility of the user who performs the authentication procedure when user authentication or the like is required when acquiring the vehicle information and the analysis information from the information management device 100. The administrator of the information management device 100 can set the content of the vehicle information and the analysis information that can be acquired from the information management device 100 according to the level of access right of the user who performs connection to the information management device 100. The administrator of the information management device 100 may set the content of the vehicle information and the analysis information in association with the access right, or may set the content of the vehicle information and the analysis information for each user.

The connection system and communication system storage unit 102*d* stores the connection system and the communication system between the information selection unit 103*c*, and the first information transmission unit 103*d* and the second information transmission unit 103*e*. FIG. 5 is a diagram illustrating an example of the connection system and the communication system stored in the connection system and communication system storage unit 102*d* according to the first embodiment.

The connection system and communication system storage unit 102*d* stores the connection system and the communication system in association with the connection destination of the information selection unit 103*c*. The information selection unit 103*c* can absorb, based on the connection system and communication system stored in the connection system and communication system storage unit 102*d*, the difference in the connection system and the communication system between the information selection unit 103*c* and the first information transmission unit 103*d*, and between the information selection unit 103*c* and the second information transmission unit 103*e* installed in the information management device 100 as the general-purpose transmission function unit, and can transmit the vehicle information and the analysis information. For example, the information selection unit 103*c* sets the first connection system as a connection system using a shared memory and sets the first communication system as an in-vehicle communication system. At this time, when the second information transmission unit 103*e* is newly installed in the information management device 100 as a general-purpose transmission function unit, the connection system and the communication system supported by the second information transmission unit 103*e* are manually set in the connection system and communication system storage unit 102*d* by the administrator of the information management device 100. Specifically, the information selection unit 103*c* sets the connection system by the shared memory of the connection system same as the first connection system as the second connection system supported by the second information transmission unit 103*e*. Further, the information selection unit 103*c* sets "J1939" as the second communication system supported by the second information transmission unit 103*e*. Note that the communication system of the first information transmission unit 103*d* and the second information transmission unit 103*e* can be set to any communication system such as "J1939". Further, the first information transmission unit 103*d* and the second information transmission unit 103*e* in the first embodiment are set as the same connection system because they are performed by the same arithmetic processing unit 103, but the first information transmission unit 103*d* and the second information transmission unit 103*e* may be connected to the information selection unit 103*c* as an arithmetic processing unit different from the information analysis unit 103*b*. In this case, when the connection system of connecting the first information transmission unit 103*d* and the second information transmission unit 103*e* is, for example, "CAN" or "Ethernet (registered trademark)", corresponding connection systems may be set as the first connection system and the second connection system. The first connection system and the second connection system illustrated in FIG. 5 can be set as independent connection systems or can be set as communication systems correlated with each other. Further, only one of the communication system and the connection system in the information selection unit 103*c* may be set. In addition, with respect to the communication system and connection system in the information collection unit 103*a* and the first information transmission unit 103*d*, in some cases, either the communication system or the connection system of the information collection unit 103*a* and the second information transmission unit 103*e* is common. In this case, it is not necessary to set in the information selection unit 103*c* the item for which either the communication system or the connection system is common. Unnecessary items are not stored in the connection system and communication system storage unit 102*d*, and unnecessary items are not set in the information selection unit 103*c* and are transmitted to the first information transmission unit 103*d* and the second information transmission unit 103*e*.

The information collection unit 103*a* can collect vehicle information. The information collection unit 103*a* collects, via the communication line 29A, the vehicle information from the sensor system 21, the control system 23 and the position detection device 27, converts the collected vehicle information to the in-vehicle communication system, and stores it in the vehicle information storage unit 102*a*. The information collection unit 103*a* transmits the collected vehicle information to the information analysis unit 103*b* and the information selection unit 103*c*. The information collection unit 103*a* does not have to transmit the collected vehicle information to the information analysis unit 103*b* when the vehicle information is fetched from the analysis information storage unit 102*b* and the analyzing process by the information analysis unit 103*b* is performed. The information collection unit 103*a* can classify each piece of data of the collected vehicle information according to the type and set a unique identifier for each classified data. For example, the information collection unit 103*a* can assign "D001" as a unique identifier for the water temperature data collected as the vehicle information, and can assign "D012" as a unique identifier for each piece of data relating to engine control collected as the vehicle information.

The information analysis unit 103*b* can generate the analysis information by analyzing the vehicle information collected by the information collection unit 103*a*. The analysis information generated by the information analysis unit 103b includes operation information such as a load state, an operating time, and a traveling state of the dump truck 2. For example, based on the pressure of the hydraulic cylinder that drives the vessel of the dump truck 2, the information analysis unit 103b can generate, as the operation information, information relating to a load state indicating a state of whether the dump truck 2 is loaded. The information analysis unit 103b can generate information relating to the operating time of the dump truck 2 as the operation information based on the time measured by the time measuring function mounted on the controller of the dump truck 2. The information analysis unit 103b can generate, as operation information, information relating to a traveling state indicating whether the dump truck 2 is traveling or is stopped based on the traveling speed of the dump truck. The information analysis unit 103b stores the generated analysis information in the analysis information storage unit 102b. The information analysis unit 103b transmits the analysis information to the information selection unit 103c. The information analysis unit 103b, the information analysis unit 103b may read the vehicle information from the vehicle information storage unit 102a to generate the analysis information. The information analysis unit 103b can classify each piece of data of the generated analysis information according to the type to set a unique identifier for each piece of data classified. For example, the information analysis unit 103b can assign "D101" as a unique identifier for the analysis data regarding the load state, which is the analysis information, and can assign "D112" as a unique identifier for the analysis data regarding the operating time, which is the analysis information.

The information selection unit 103c can perform, based on the selection definition stored in the selection definition storage unit 102c, a process of selecting information to be transmitted to each of the first information transmission unit 103d and the second information transmission unit 103e. The information selected by the information selection unit 103c as the information to be transmitted to each of the first information transmission unit 103d and the second information transmission unit 103e includes at least one of the vehicle information and the analysis information.

That is, the information selection unit 103c determines whether the vehicle information or the analysis information has been received. When the information selection unit 103c receives the vehicle information defined by the in-vehicle communication system from among the vehicle information and the analysis information, the information selection unit 103c acquires the selection definition from the selection definition storage unit 102c. Then, the information selection unit 103c selects the first information transmission unit 103d or the second information transmission unit 103e. When selecting the first information transmission unit 103d, the information selection unit 103c selects the information to be transmitted to the first information transmission unit 103d from among the received vehicle information based on the selection definition. The information selection unit 103c selects the vehicle information for which "transmission allowed" is set in the propriety of transmission of the vehicle information illustrated in FIG. 4 as information to be transmitted to the first information transmission unit 103d. For example, the information selection unit 103c can select vehicle information Dv1 illustrated in FIG. 3 as the information to be transmitted to the first information transmission unit 103d. Similarly, when selecting the second information transmission unit 103e, the information selection unit 103c also selects the information to be transmitted to the second information transmission unit 103e from among the vehicle information based on the selection definition. For example, the information selection unit 103c can select vehicle information dv2 illustrated in FIG. 3 as the information to be transmitted to the second information transmission unit 103e. The vehicle information dv2 is, for example, part of the information included in the vehicle information Dv1.

In addition, when receiving the analysis information defined by the in-vehicle communication system among the vehicle information and the analysis information, the information selection unit 103c acquires the selection definition from the selection definition storage unit 102c as the case where the vehicle information is received. Then, the information selection unit 103c selects the first information transmission unit 103d or the second information transmission unit 103e. When selecting the first information transmission unit 103d, the information selection unit 103c selects the information to be transmitted to the first information transmission unit 103d from among the received analysis information based on the selection definition. The information selection unit 103c selects, as the information to be transmitted to the first information transmission unit 103d, the analysis information for which "transmission allowed" is set in the propriety of transmission of the analysis information illustrated in FIG. 4. For example, the information selection unit 103c can select first analysis information Da1 illustrated in FIG. 3 as the information to be transmitted to the first information transmission unit 103d. When selecting the second information transmission unit 103e, the information selection unit 103c does not perform selection of the information to be transmitted to the second information transmission unit 103e from among the analysis information as a result of complying with the selection definition illustrated in FIG. 4.

The information selection unit 103c performs a conversion from the in-vehicle communication system to the communication system corresponding to the first information transmission unit 103d according to the communication system stored in the connection system and communication system storage unit 102d, and transmits, based on the selection definition, the selected information to the first information transmission unit 103d. In addition, the information selection unit 103c performs a conversion from the in-vehicle communication system to the communication system corresponding to the second information transmission unit 103e according to the communication system stored in the connection system and communication system storage unit 102d, and transmits, based on selection definition, the selected information to the second information transmission unit 103e.

By complying with the selection definition illustrated in FIG. 4, the information selection unit 103c can transmit all of the vehicle information acquired from the information collection unit 103a and the analysis information acquired from the information analysis unit 103b to the first information transmission unit 103d. On the other hand, the information selection unit 103c can transmit part of the vehicle information acquired from the information collection unit 103a to the second information transmission unit 103e by complying with the selection definition illustrated in FIG. 4. In this way, the information selection unit 103c can change the information to be transmitted according to the information transmission destination.

By changing the selection definition illustrated in FIG. 4, the analysis information is allowed to be transmitted from the information selection unit 103c to the second information transmission unit 103e. For example, when it is desired to transmit information relating to the load state of the analysis information to the second information transmission unit 103e, the unique identifier assigned to the information relating to the load state may be set as the information that is allowed to be transmitted to the second information transmission unit 103e.

The first information transmission unit 103d transmits the information acquired from the information selection unit 103c to the communication device 25. The second information transmission unit 103e transmits the information acquired from the information selection unit 103c to the communication device 25.

The second information transmission unit 103e is a general-purpose transmission function unit that can transmit the vehicle information and the analysis information by a preset connection system and a preset communication system, and is newly installed as an additional function to the information management device 100. The connection system and the transmission method of the second information transmission unit 103e are arbitrarily defined independently of the first information transmission unit 103d. Examples of the general-purpose transmission function unit include at least one of general-purpose software incorporated in the information management device 100 to provide the information management device 100 with a transmission function and a general-purpose transmission module. As previously set in the connection system and communication system storage unit 102d described above, the information management device 100 can support the connection system and the communication system of exchanging data between the built-in general-purpose software and the transmission module in advance. When incorporating the general-purpose transmission function unit by software, the information management device 100 can be implemented as various extension functions such as an add-on and a plug-in of existing programs pre-installed for controlling the process of the information management device 100. The information management device 100 can easily add a mechanism for providing information by incorporating a general-purpose transmission function unit. Like the second information transmission unit 103e illustrated in FIG. 3, the information management device 100 is not limited to an example having only one general-purpose transmission function unit, and may have a plurality of general-purpose transmission function units. The second information transmission unit 103e is an example of a general-purpose processing function unit. The second information transmission unit 103e transmits data via the communication network 3 to which any communication unit can be connected.

FIG. 6 is a flowchart illustrating an example of the process of the information management device 100 according to the first embodiment. The process illustrated in FIG. 6 may be repeatedly performed during the operation of the information management device 100, for example.

As illustrated in FIG. 6, the information selection unit 103c determines whether the vehicle information or the analysis information has been received (step S101). When the vehicle information or the analysis information has not been received as a result of the determination (step S101, No), the information selection unit 103c repeats the determination of step S101.

When the vehicle information or the analysis information has been received as a result of the determination (step S101, Yes), the information selection unit 103c selects the first information transmission unit 103d or the second information transmission unit 103e (step S102).

Then, the information selection unit 103c selects, based on the selection definition acquired from the selection definition storage unit 102c, information to be transmitted to the first information transmission unit 103d or the second information transmission unit 103e selected in step S102 (step S103).

Then, the information selection unit 103c transmits the information selected in step S103 to the transmission unit selected in step S102, that is, the first information transmission unit 103d and the second information transmission unit 103e (step S104).

Then, the information selection unit 103c determines whether all the transmission units, that is, the first information transmission unit 103d and the second information transmission unit 103e, were selected (step S105).

When all the transmission units are selected as a result of the determination (step S105, Yes), the information selection unit 103c returns the process to the determination in step S101 described above.

When not all the transmission units are selected as a result of the determination (step S105, No), the information selection unit 103c returns the process to the procedure of step S102 described above. That is, returning to step S102 described above, the information selection unit 103c selects a transmission unit that is not selected from among the first information transmission unit 103d and the second information transmission unit 103e, and performs the process after step S103.

As described above, according to the first embodiment, the information management device 100 can incorporate the second information transmission unit 103e, which is a general-purpose transmission function unit. Therefore, the information management device 100 can easily acquire a mechanism for providing information to, for example, the server 10B having an administrator different from an administrator of the server 10A. Further, according to the first embodiment, it is possible to arbitrarily change, according to the selection definition, the information to be transmitted to the second information transmission unit 103e, which is the general-purpose transmission function unit. Further, according to the first embodiment, a second information transmission unit 103e is interposed between the information management device 100, and the server 10A and the server 10B, and the transmission of information to the second information transmission unit 103e is controlled, so that for example, the same vehicle information such as data regarding the load state can be easily shared between the server 10A and the server 10B.

Further, according to the first embodiment, the information management device 100 can change the information to be transmitted from among the vehicle information and the analysis information according to the transmission destination based on the selection definition. That is, the information management device 100 can easily change the content of the information to be transmitted depending on whether the information transmission destination is the first information transmission unit 103d or the second information transmission unit 103e. Therefore, the information management device 100 can easily manage the information to be transmitted to the general-purpose transmission function unit even when the general-purpose transmission function unit is newly installed.

Further, according to the first embodiment, the first information transmission unit 103d and the second information transmission unit 103e can create the selection definition according to the degree of a risk (communication risk level) when communicating with the outside of the information management device 100 via the communication network 3. Alternatively, according to the first embodiment, it is possible to create the selection definition based on the access right assigned in advance according to the job responsibility of the user who acquires the vehicle information and the analysis information. Therefore, according to the first embodiment, the transmission of the vehicle information and the analysis information can be managed in more detail. That is, the information management device 100 can manage the provision of information to the general-purpose transmission function unit in response to a request from the administrator of the information management device 100. For example, when the administrator of the information management device 100 has a request to manage the provision of the operation information such as data regarding the load state, the information management device 100 can manage the transmission of the operation information to the general-purpose transmission function unit according to the request from the administrator of the information management device 100.

Second Embodiment

Figure 7:
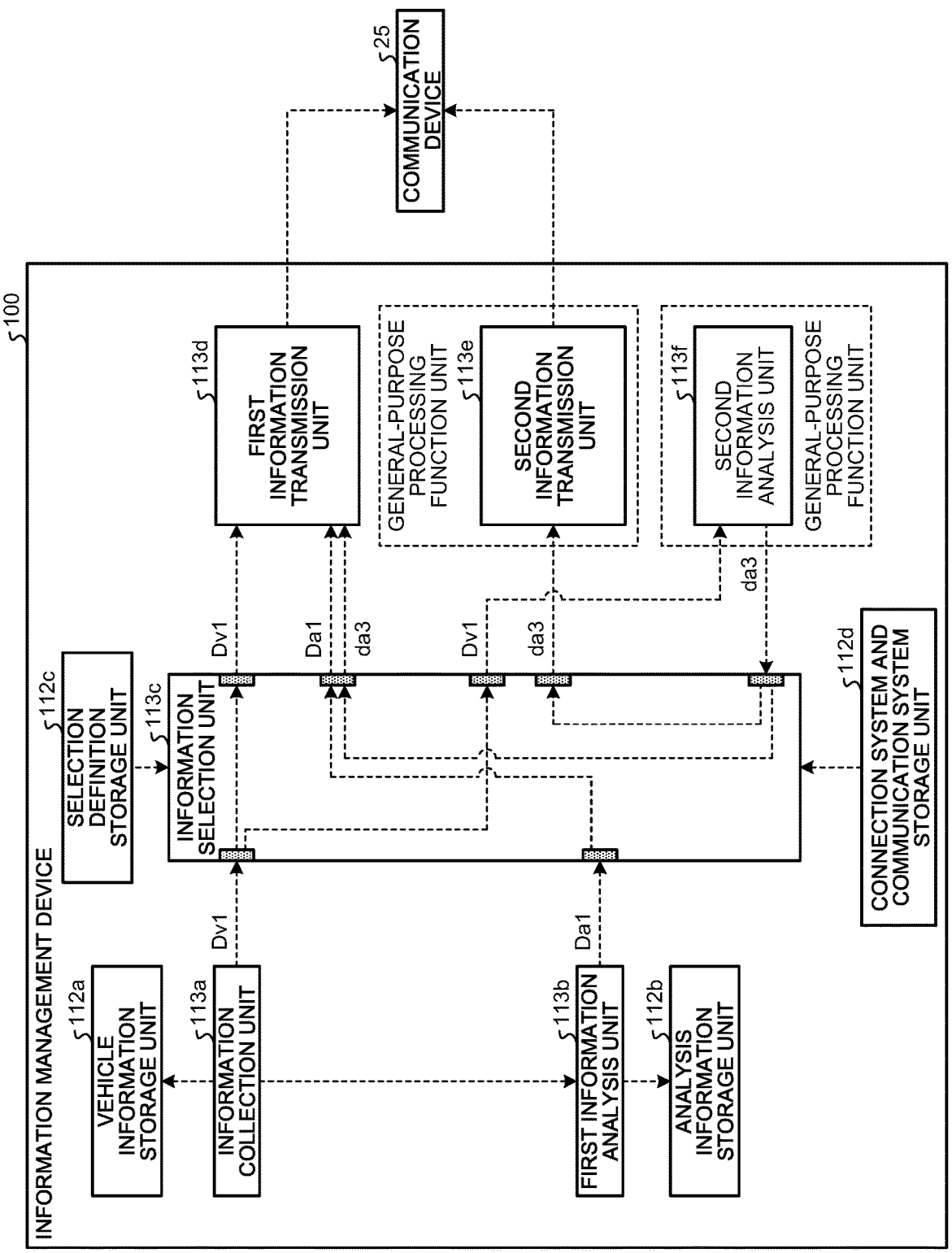
FIG. 7 is a block diagram illustrating an example of a functional configuration of an information management device according to a second embodiment.

FIG. 7 is a block diagram illustrating an example of the functional configuration of the information management device 100 according to the second embodiment.

The information management device 100 illustrated in FIG. 7 includes a vehicle information storage unit 112*a*, an analysis information storage unit 112*b*, a selection definition storage unit 112*c*, a connection system and communication system storage unit 112*d*, an information collection unit 113*a*, a first information analysis unit 113*b*, an information selection unit 113*c*, a first information transmission unit 113*d*, a second information transmission unit 113*e*, and a second information analysis unit 113*f*.

The vehicle information storage unit 112*a*, the analysis information storage unit 112*b*, the selection definition storage unit 112*c*, and the connection system and communication system storage unit 112*d* are included in the storage area of the storage device 102, for example. The information collection unit 113*a*, the first information analysis unit 113*b*, the information selection unit 113*c*, the first information transmission unit 113*d*, the second information transmission unit 113*e*, and the second information analysis unit 113*f* are included in various arithmetic processes performed by, for example, the arithmetic processing unit 103.

The vehicle information storage unit 112*a* stores the vehicle information collected by the information collection unit 113*a*. The vehicle information storage unit 112*a* corresponds to the vehicle information storage unit 102*a* described in the first embodiment.

The analysis information storage unit 112*b* stores first analysis information generated by the first information analysis unit 113*b*. The analysis information storage unit 112*b* corresponds to the analysis information storage unit 102*b* described in the first embodiment.

The selection definition storage unit 112*c* stores the selection definition that defines the transmission propriety information whether it is allowed to transmit the vehicle information, the first analysis information, and the second analysis information to the second information transmission unit 113*e* and the second information analysis unit 113*f*. The selection definition storage unit 112*c* corresponds to the selection definition storage unit 102*c* described in the first embodiment, but differs from the first embodiment in that it has a definition for second analysis information.

FIG. 8 is a diagram illustrating a configuration example of a selection definition stored in the selection definition storage unit 112*c* according to the second embodiment. As illustrated in the example in FIG. 8, the selection definition storage unit 112*c* stores, for example, a selection definition in which each item of a transmission destination, a vehicle information type ID, a propriety of transmission of vehicle information, a first analysis information type ID, a propriety of transmission of first analysis information, a second analysis information type ID, and a propriety of transmission of second analysis information is associated with each other. The transmission destination refers to the first information transmission unit 113*d*, the second information transmission unit 113*e*, and the second information analysis unit 113*f* in the second embodiment.

In the item of the transmission destination, the transmission destinations of the vehicle information, the first analysis information, and the second analysis information transmitted from the information selection unit 113*c* are set. In the example illustrated in FIG. 8, the first information transmission unit 113*d*, the second information transmission unit 113*e*, and the second information analysis unit 113*f* are set as the transmission destinations of the vehicle information, the first analysis information, and the second analysis information.

The item of the vehicle information type ID and the item of the propriety of transmission of the vehicle information are similar to the item of the vehicle information type ID and the item of the propriety of transmission of the vehicle information of the selection definition storage unit 102*c* described in the first embodiment.

The item of the first analysis information type ID and the item of the propriety of transmission of the first analysis information are similar to the item of the analysis information type ID and the item of the propriety of transmission of the analysis information of the selection definition storage unit 102*c* described in the first embodiment.

In the item of the second analysis information type ID, when each piece of data included in the second analysis information generated by the second information analysis unit 113*f* is classified according to the type, an identifier that is uniquely assigned to the category to which each piece of data belongs is set. The second analysis information type ID is assigned by the second information analysis unit 113*f*. As an example, "D201" may be assigned by the second information analysis unit 113*f* as a unique identifier for the analysis data relating to the water temperature data, which is the analysis information, and "D212" may be assigned by the second information analysis unit 113*f* as a unique identifier for each piece of data relating to engine control, which is analysis information.

In the item of the propriety of transmission of the second analysis information, a value indicating whether it is allowed to transmit each piece of data included in the second analysis information is set for each transmission destination. In the example illustrated in FIG. 8, "transmission allowed" is set as the value indicating that transmission is allowed, and "transmission not allowed" is set as the value indicating that transmission is not allowed. For the second analysis information, the second information analysis unit 113*f* is the generation source, so that a value indicating whether transmission is allowed is not set.

According to the selection definition illustrated in FIG. 8, that all the vehicle information, the first analysis information, and the second analysis information are transmitted from the information selection unit 113*c* to the first information transmission unit 113*d* is defined. Further, according to the selection definition illustrated in FIG. 8, that only the second analysis information is transmitted from the information selection unit 113c to the second information transmission unit 113e is defined. Further, according to the selection definition illustrated in FIG. 8, that only the vehicle information is transmitted from the information selection unit 113c to the second information analysis unit 113f is defined.

Figures 9, 10:
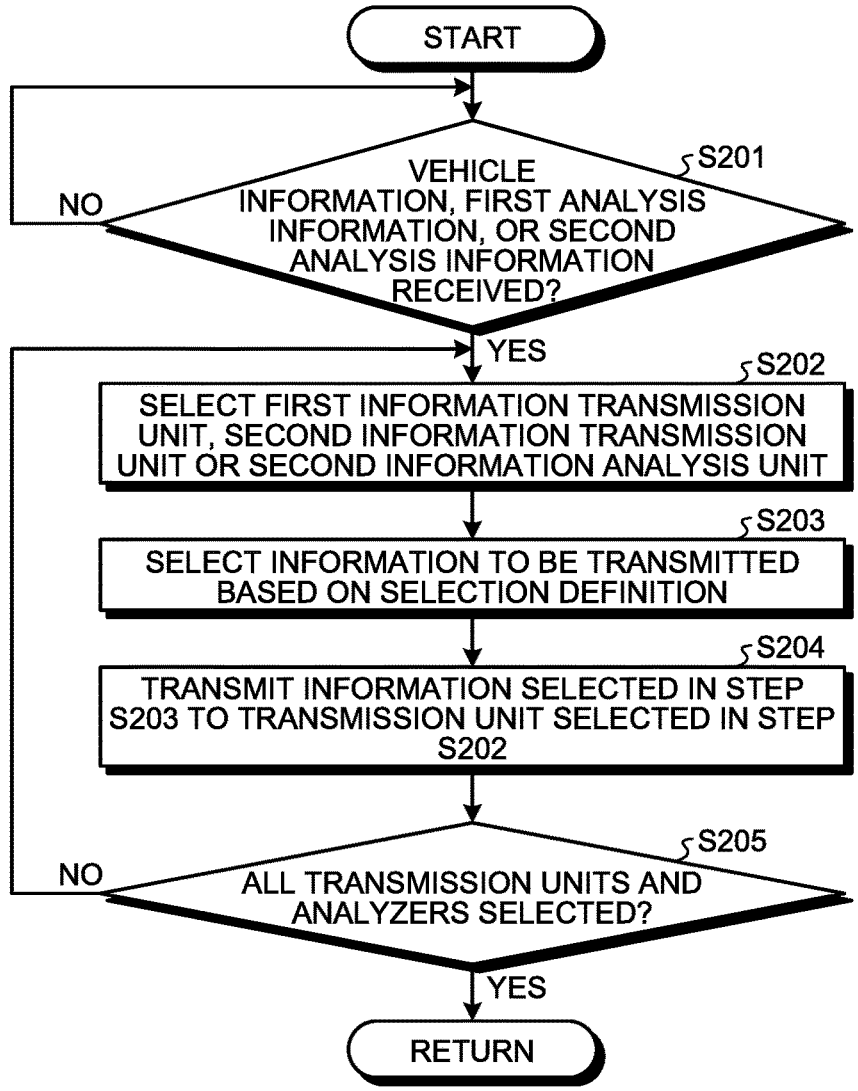
FIG. 9 is a diagram illustrating an example of a connection system and a communication system stored in a connection system and communication system storage unit according to the second embodiment.
FIG. 10 is a flowchart illustrating an example of processing by the information management device according to the second embodiment.

FIG. 9 is a diagram illustrating an example of the connection system and the communication system stored in the connection system and communication system storage unit 112d according to the second embodiment. The connection system and communication system storage unit 112d stores the connection system and the communication system between the information selection unit 113c, and the first information transmission unit 113d, the second information transmission unit 113e, and the second information analysis unit 113f.

The connection system and communication system storage unit 112d stores the connection system and the communication system in association with the connection destination of the information selection unit 113c. The information selection unit 103c can absorb, based on the connection system and communication system stored in the connection system and communication system storage unit 112d, the difference in the connection system and the communication system between the information selection unit 103c and the second information analysis unit 113f installed in the information management device 100 as a general-purpose analysis function unit, and can transmit the vehicle information and the analysis information. For example, when the second information analysis unit 113f is newly installed in the information management device 100 as a general-purpose analysis function unit, the connection system and the communication system supported by the second information analysis unit 113f are manually set in the connection system and communication system storage unit 112d by the administrator of the information management device 100. As an example, it is conceived that the connection system by the shared memory is set as a third connection system supported by the second information analysis unit 113f, and "J1939" is set as a third communication system supported by the second information analysis unit 113f. The first connection system, the second connection system, and the third connection system illustrated in FIG. 9 can be set as mutually independent connection systems, or the first communication system, the second communication system, and the third communication system illustrated in FIG. 9 can be set as mutually independent communication systems.

The information collection unit 113a can collect vehicle information. The information collection unit 113a basically has the same function as the information collection unit 103a described in the first embodiment. The information collection unit 113a can add a unique identifier for collectively specifying the collected vehicle information by type. For example, the information collection unit 113a can classify each piece of data of collected vehicle information according to the type and set a unique identifier for each piece of data classified. For example, the information collection unit 113a can assign "D001" as a unique identifier for water temperature data, which is the vehicle information, and can assign "D012" as a unique identifier for each piece of data relating to engine control, which is the vehicle information.

The first information analysis unit 113b can generate the analysis information by analyzing the vehicle information collected by the information collection unit 113a. The first information analysis unit 113b basically has the same function as the information analysis unit 103b described in the first embodiment. The first information analysis unit 113b can classify each piece of data of the generated analysis information according to the type, and can set a unique identifier for each piece of data classified. For example, the first information analysis unit 113b can assign "D101" as a unique identifier for the analysis data regarding the water temperature data, which is the analysis information, and can assign "D112" as a unique identifier for the analysis data regarding the engine control, which is the analysis information.

The information selection unit 113c basically has the same function as the information selection unit 103c described in the first embodiment. That is, the information selection unit 113c can perform, based on the selection definition stored in the selection definition storage unit 112c, a process of selecting information to be transmitted to each of the first information transmission unit 113d, the second information transmission unit 113e, and the second information analysis unit 113f. The information selected by the information selection unit 113c as the information to be transmitted to each of the first information transmission unit 113d, the second information transmission unit 113e, and the second information analysis unit 113f includes at least one of the vehicle information, the first analysis information, and the second analysis information.

The information selection unit 113c determines whether vehicle information, first analysis information, or second analysis information has been received. When receiving the vehicle information, the information selection unit 113c acquires the selection definition from the selection definition storage unit 112c. Then, the information selection unit 113c selects the first information transmission unit 113d, the second information transmission unit 113e, or the second information analysis unit 113f. When selecting the first information transmission unit 113d, the information selection unit 113c selects the information to be transmitted to the first information transmission unit 113d from among the received vehicle information based on the selection definition. The information selection unit 113c selects the vehicle information for which "transmission allowed" is set in the propriety of transmission of the vehicle information illustrated in FIG. 8 as information to be transmitted to the first information transmission unit 113d. Similarly, when selecting the second information analysis unit 113f, the information selection unit 113c selects the information to be transmitted to the second information analysis unit 113f from among the received vehicle information based on the selection definition. For example, the information selection unit 113c can select the vehicle information Dv1 illustrated in FIG. 7 as the information to be transmitted to the first information transmission unit 113d and the second information analysis unit 113f. When selecting the second information transmission unit 113e, the information selection unit 113c does not perform selection of the information to be transmitted to the second information transmission unit 113e from among the vehicle information as a result of complying with the selection definition.

Further, when the information selection unit 113c receives the first analysis information, the information selection unit 113c acquires the selection definition from the selection definition storage unit 112c. Then, the information selection unit 113c selects the first information transmission unit 113d, the second information transmission unit 113e, or the second information analysis unit 113f. When selecting the first information transmission unit 113d, the information selection unit 113c selects the information to be transmitted to the first information transmission unit 113d from among the received first analysis information based on the selection definition. The information selection unit 113c selects, as the information to be transmitted to the first information transmission unit 113d, the first analysis information for which "transmission allowed" is set in the propriety of transmission of the first analysis information illustrated in FIG. 8. For example, the information selection unit 113c can select the first analysis information Da1 illustrated in FIG. 7 as the information to be transmitted to the first information transmission unit 113d. When selecting the second information transmission unit 113e or the second information analysis unit 113f, the information selection unit 113c does not perform selection of the information to be transmitted to the second information transmission unit 113e or the second information analysis unit 113f from among the first analysis information as a result of complying with the selection definition.

In addition, when the information selection unit 113c receives the second analysis information, the information selection unit 113c acquires the selection definition from the selection definition storage unit 112c. Then, the information selection unit 113c selects the first information transmission unit 113d, the second information transmission unit 113e, or the second information analysis unit 113f. When selecting the first information transmission unit 113d, the information selection unit 113c selects the information to be transmitted to the first information transmission unit 113d from among the received second analysis information based on the selection definition. The information selection unit 113c selects, as the information to be transmitted to the first information transmission unit 113d, the second analysis information for which "transmission allowed" is set in the propriety of transmission of the second analysis information illustrated in FIG. 8. Similarly, when selecting the second information transmission unit 113e, the information selection unit 113c also selects the information to be transmitted to the second information transmission unit 113e from among the second analysis information based on the selection definition. The information selection unit 113c selects, as the information to be transmitted to the second information transmission unit 113e, the second analysis information for which "transmission allowed" is set in the propriety of transmission of the second analysis information illustrated in FIG. 8. For example, the information selection unit 113c can select second analysis information da3 illustrated in FIG. 7 as the information to be transmitted to the first information transmission unit 113d and the second information transmission unit 113e.

The information selection unit 113c performs a conversion from the in-vehicle communication system to the communication system corresponding to the first information transmission unit 113d according to the communication system stored in the connection system and communication system storage unit 112d, and transmits the selected information to the first information transmission unit 113d based on selection definition. In addition, the information selection unit 113c performs a conversion from the in-vehicle communication system to the communication system corresponding to the second information transmission unit 113e according to the communication system stored in the connection system and communication system storage unit 112d, and transmits the selected information to the second information transmission unit 113e based on selection definition. In addition, the information selection unit 113c performs a conversion from the in-vehicle communication system to the communication system corresponding to the second information analysis unit 113f according to the communication system stored in the connection system and communication system storage unit 112d, and transmits the selected information to the second information analysis unit 113f based on selection definition.

The information selection unit 113c can transmit all of the vehicle information, the first analysis information, or the second analysis information to the first information transmission unit 113d by complying with the selection definition illustrated in FIG. 8. Further, the information selection unit 113c can transmit the second analysis information to the second information transmission unit 113e by complying with the selection definition illustrated in FIG. 8. Further, the information selection unit 113c can transmit the vehicle information to the second information analysis unit 113f by complying with the selection definition illustrated in FIG. 8. In this way, the information selection unit 113c can change the information to be transmitted according to the information transmission destination.

By changing the selection definition illustrated in FIG. 8, the analysis information is allowed to be transmitted from the information selection unit 113c to the second information analysis unit 113f. For example, when it is desired to transmit information relating to the load state of the analysis information to the second information analysis unit 113f, the unique identifier assigned to the information relating to the load state may be set as the information that is allowed to be transmitted to the second information analysis unit 113f.

The first information transmission unit 113d has the same function as the first information transmission unit 103d described in the first embodiment, and transmits the information acquired from the information selection unit 113c to the communication device 25. The second information transmission unit 113e is a general-purpose transmission function unit having the same function as the second information transmission unit 103e described in the first embodiment, and transmits the information acquired from the information selection unit 113c to the communication device 25. The second information transmission unit 113e is an example of a general-purpose processing function unit.

The second information analysis unit 113f generates the second analysis information by analyzing the vehicle information acquired from the information selection unit 113c. The second information analysis unit 113f can transmit the generated second analysis information to the information selection unit 113c.

The second information analysis unit 113f is, for example, a general-purpose analysis function unit that can analyze an analysis method of the vehicle information and the analysis information by an analysis method defined in advance, and is newly implemented as an additional function to the information management device 100. The analysis method of the second information analysis unit 113f is arbitrarily defined independently of the first information analysis unit 113b. As the general-purpose analysis function unit, at least one of general-purpose software incorporated in the information management device 100 to provide the information management device 100 with an analysis function and general-purpose analysis module is exemplified. As previously set in the connection system and communication system storage unit 112d described above, the information management device 100 can support the connection system and the communication system of exchanging data between the built-in general-purpose software and the analysis module in advance. When incorporating the general-purpose analysis function unit by software, the information management device 100 can be implemented as various extension functions such as an add-on and a plug-in of existing programs pre-installed for controlling the process of the information management device 100. The information management device 100 can easily acquire the mechanism of information analysis by incorporating the general-purpose analysis function unit. Like the second information analysis unit 113*f* illustrated in FIG. 7, the information management device 100 is not limited to an example having only one general-purpose information analysis function unit, and may have a plurality of general-purpose information analysis function units. The second information analysis unit 113*f* is an example of a general-purpose processing function unit. The information management device 100 incorporates the second information analysis unit 113*f*, which is a general-purpose analysis function unit, and can transmit the analysis result by the second information analysis unit 113*f* to the server 10A managed by the administrator of the information management device 100, so that the administrator uses the analysis result by the second information analysis unit 113*f*. The second information analysis unit 113*f* is an example of a general-purpose processing function unit.

FIG. 10 is a flowchart illustrating an example of processing by the information management device 100 according to the second embodiment. The process illustrated in FIG. 10 may be repeatedly performed during the operation of the information management device 100, for example. The process illustrated in FIG. 10 differs from the process performed by the information management device 100 according to the first embodiment in the determination in step S201.

As illustrated in FIG. 10, the information selection unit 113*c* determines whether the vehicle information, the first analysis information, or the second analysis information has been received (step S201). When the vehicle information, the first analysis information, or the second analysis information is not received as a result of the determination (step S201, No), the information selection unit 113*c* repeats the determination of step S201.

When the vehicle information, the first analysis information, or the second analysis information is received as a result of the determination (step S201, Yes), the information selection unit 113*c* selects the first information transmission unit 113*d*, the second information transmission unit 113*e*, or the second information analysis unit 113*f* (step S202).

Then, the information selection unit 113*c* selects, based on the selection definition acquired from the selection definition storage unit 112*c*, the information to be transmitted to the first information transmission unit 113*d*, the second information transmission unit 113*e*, or the second information analysis unit 113*f* selected in step S202 (step S203).

Then, the information selection unit 113*c* transmits the information selected in step S203 to the transmission unit selected in step S202, that is, the first information transmission unit 113*d*, the second information transmission unit 113*e*, or the second information analysis unit 113*f* (step S204).

Then, the information selection unit 113*c* determines whether all of the transmission units and the analysis units, that is, the first information transmission unit 113*d*, the second information transmission unit 113*e*, or the second information analysis unit 113*f*, were selected (step S205).

When all the transmission units and the analysis units are selected as a result of the determination (step S205, Yes), the information selection unit 113*c* returns the process to the determination in step S201 described above.

When not all the transmission units and the analysis units are selected as a result of the determination (step S205, No), the information selection unit 113*c* returns the process to the procedure of step S202 described above. That is, returning to step S202 described above, the information selection unit 113*c* selects a transmission unit that is not selected from among the first information transmission unit 113*d*, the second information transmission unit 113*e*, and the second information analysis unit 113*f*, and performs the process after step S203.

As described above, according to the second embodiment, the information management device 100 can incorporate the second information analysis unit 113*f*, which is a general-purpose analysis function unit. Therefore, the information management device 100 can easily acquire the mechanism of information analysis. Further, the information management device 100 can easily manage the information to be transmitted to the newly installed general-purpose information analysis unit even when the general-purpose information analysis unit is newly installed. Further, according to the second embodiment, the information desired to be analyzed by the second information analysis unit 113*f*, which is the general-purpose analysis function unit, by the selection definition, can be arbitrarily changed. Further, according to the second embodiment, by controlling the transmission of information to the second information analysis unit 113*f* by the selection definition, while interposing the second information analysis unit 113*f* between the information management device 100, and the server 10A and the server 10B, the analysis information generated by the general-purpose analysis function unit can be easily shared in the server 10A and the server 10B.

Figure 11:
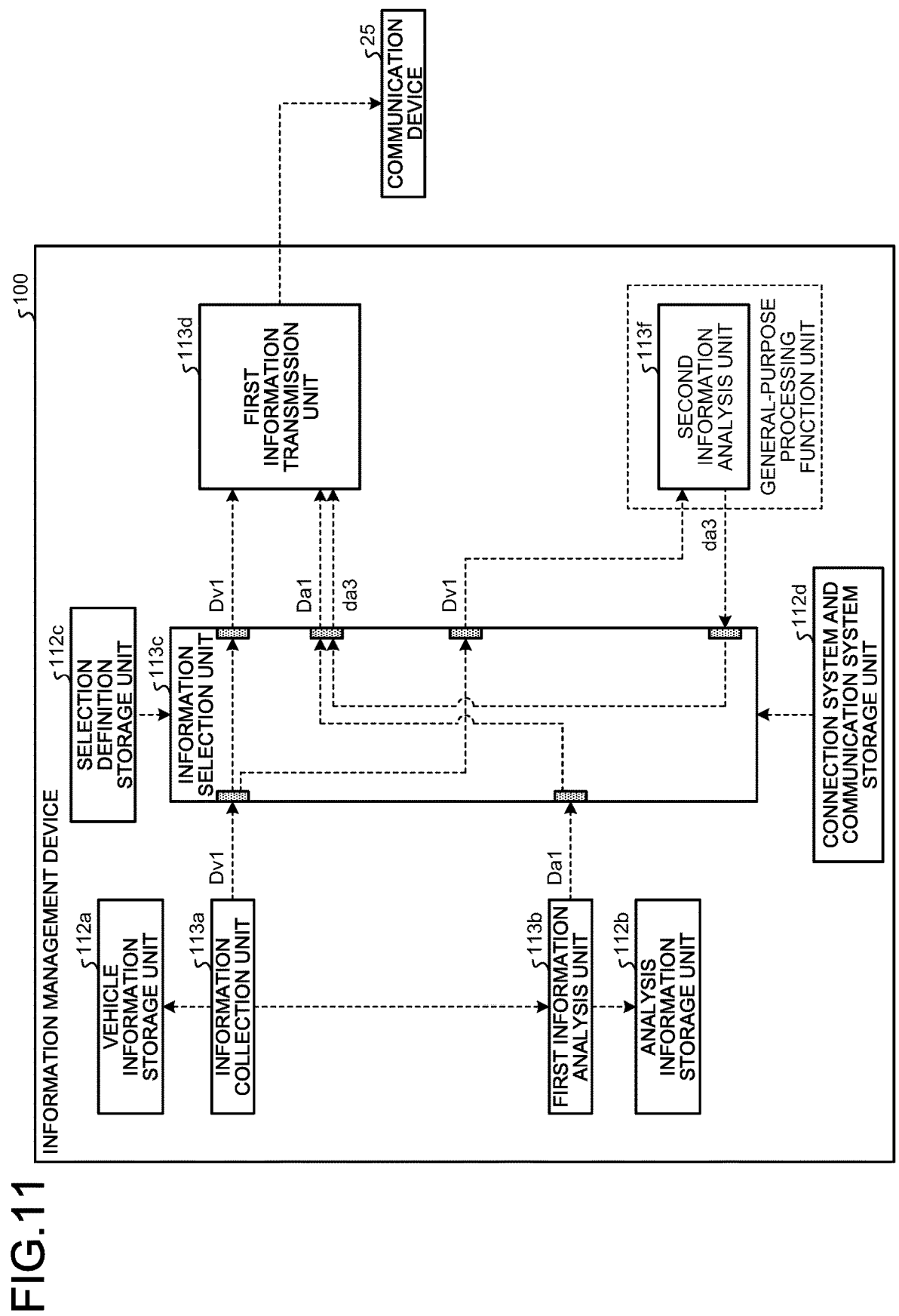
FIG. 11 is a diagram illustrating another example of the functional configuration of the information management device.

FIG. 11 is a diagram illustrating another example of the functional configuration of the information management device 100. In the first embodiment described above, the example in which the information management device 100 has the second information transmission unit 103*e* as a general-purpose processing function unit will be described, and in the second embodiment described above, the example in which the information management device 100 has the second information transmission unit 113*e* and the second information analysis unit 113*f* as the general-purpose processing function units has been described, but the present invention is not limited to the examples. As illustrated in FIG. 8, the information management device 100 may include only the second information analysis unit 113*f* described in the second embodiment as a general-purpose processing function unit. With such a configuration, the administrator of the information management device 100 can selectively incorporate the general-purpose analysis function unit from among the general-purpose processing function units, so that the administrator of the information management device 100 can utilize the analysis result by the second information analysis unit 113*f*.

Third Embodiment

Figure 12:
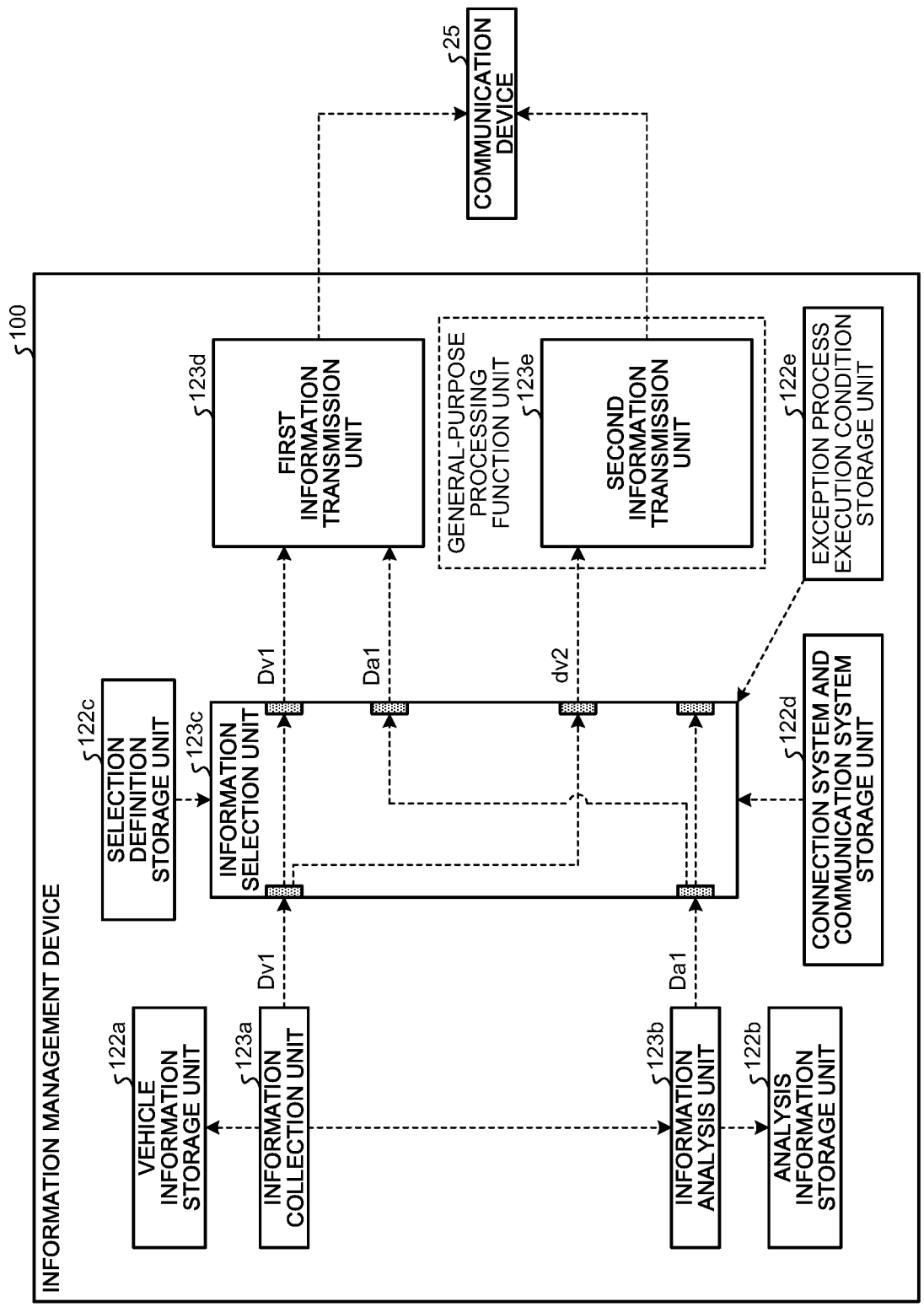
FIG. 12 is a block diagram illustrating an example of a functional configuration of an information management device according to a third embodiment.

In the first embodiment described above, the information management device 100 may execute an exception process according to a specific situation or the like. In the third embodiment described below, the information management device 100 that executes an exception process will be described. FIG. 12 is a block diagram illustrating an example of the functional configuration of the information management device 100 according to the third embodiment.

The information management device 100 illustrated in FIG. 12 includes a vehicle information storage unit 122*a*, an analysis information storage unit 122b, a selection definition storage unit 122c, a connection system and communication system storage unit 122d, an exception process execution condition storage unit 122e, an information collection unit 123a, an information analysis unit 123b, an information selection unit 123c, a first information transmission unit 123d, and a second information transmission unit 123e.

The vehicle information storage unit 122a, the analysis information storage unit 122b, the selection definition storage unit 122c, the connection system and communication system storage unit 122d, and the exception process execution condition storage unit 122e are included in the storage area of the storage device 102, for example. The information collection unit 123a, the information analysis unit 123b, the information selection unit 123c, the first information transmission unit 123d, and the second information transmission unit 123e are included in various arithmetic processes performed by the arithmetic processing unit 103, for example.

FIG. 13 is a diagram illustrating an example of information stored in the vehicle information storage unit 122a according to the third embodiment. The vehicle information storage unit 122a corresponds to, for example, the vehicle information storage unit 102a described in the first embodiment. The vehicle information storage unit 122a is similar to that of the first embodiment in that it stores the vehicle information collected by the information collection unit 123a, but as illustrated in FIG. 12, it is different from that of the first embodiment in that flag information represented by the error information and the priority information is stored in association the with vehicle information.

The priority information associated with the vehicle information is assigned according to the specific operation state of the dump truck 2. The specific operation state is an unintended operation state of the dump truck 2. For example, the unintentional operation state of the dump truck 2 includes an idle state of dump truck 2 in which the dump truck 2 is waiting for a long time at the same place, an operating state in which the operator of the dump truck 2 performs an abrupt steering, and a traveling state in which the dump truck 2 is traveling away from the normal running course. The error information associated with the vehicle information is assigned when the dump truck 2 is in a malfunctioning state such as a failure. The priority information and the error information associated with the vehicle information are assigned by the sensor system 21 or the control system 23.

FIG. 14 is a diagram illustrating an example of information stored in the analysis information storage unit 122b according to the third embodiment. The analysis information storage unit 122b corresponds to, for example, the analysis information storage unit 102b described in the first embodiment. The analysis information storage unit 122b is similar to that of the first embodiment in that the analysis information storage unit 122b stores the analysis information generated by the information analysis unit 123b, but as illustrated in FIG. 14, it is different from that of the first embodiment in that the error information and the priority information are stored in association with the analysis information.

The priority information and the error information associated with the analysis information are assigned by the information analysis unit 123b. The priority information associated with the analysis information is assigned by the information analysis unit 123b to the analysis information indicating the specific operation state of the dump truck 2 as a result of analyzing the vehicle information and generating the analysis information. As described above, the specific operation state is not a malfunctioning state such as a failure of the dump truck 2, but is an unintended operation state of the dump truck 2, so that as a result of the analysis, the error information is assigned to the analysis information that is determined to be the malfunctioning state of the dump truck 2, but the priority information is not assigned.

The vehicle information and the analysis information each have a property as information. For example, in light of the purpose of maintenance and inspection of the dump truck 2, the water temperature data has a property that is information which should be provided, but the personal information of the worker who gets on the dump truck 2 does not have a property that is information which should be provided. As described above, the priorities set in the vehicle information and the analysis information are closely relating to whether the information should be provided in light of the purposes such as the efficient operation, the maintenance and inspection, and the like of the dump truck 2. For example, the error information indicating the malfunctioning state of the dump truck has a property that all the information should be provided in light of the purposes of the efficient operation, the maintenance and inspection, and the like of the dump truck 2. In addition, the information corresponding to the specific operation state, which is an unintended operation state of the dump truck 2, has a property that all the information should be provided in light of the purposes of the efficient operation, the maintenance and inspection, and the like of the dump truck 2.

The selection definition storage unit 122c corresponds to the selection definition storage unit 102c described in the first embodiment. That is, the selection definition storage unit 122c stores the selection definition that defines the transmission propriety information indicating whether it is allowed to transmit the vehicle information and the analysis information to the first information transmission unit 123d or the second information transmission unit 123e. The transmission destination refers to the first information transmission unit 123d or the second information transmission unit 123e in the third embodiment. In addition, the selection definition storage unit 122c includes a selection definition corresponding to the exception process. In an example of the selection definition corresponding to the exception process, the definition that all the vehicle information and the analysis information including the error information and the priority information are selected is exemplified. The selection definition can be arbitrarily defined by the administrator of the information management device 100. The selection definition corresponding to the exception process functions as the first selection definition, and the selection definition not corresponding to the exception process functions as the second selection definition.

The connection system and communication system storage unit 122d corresponds to the connection system and communication system storage unit 102d described in the first embodiment. That is, the connection system and communication system storage unit 122d stores the connection system and the communication system between the information selection unit 123c, and the first information transmission unit 123d and the second information transmission unit 123e.

Figures 15, 16:
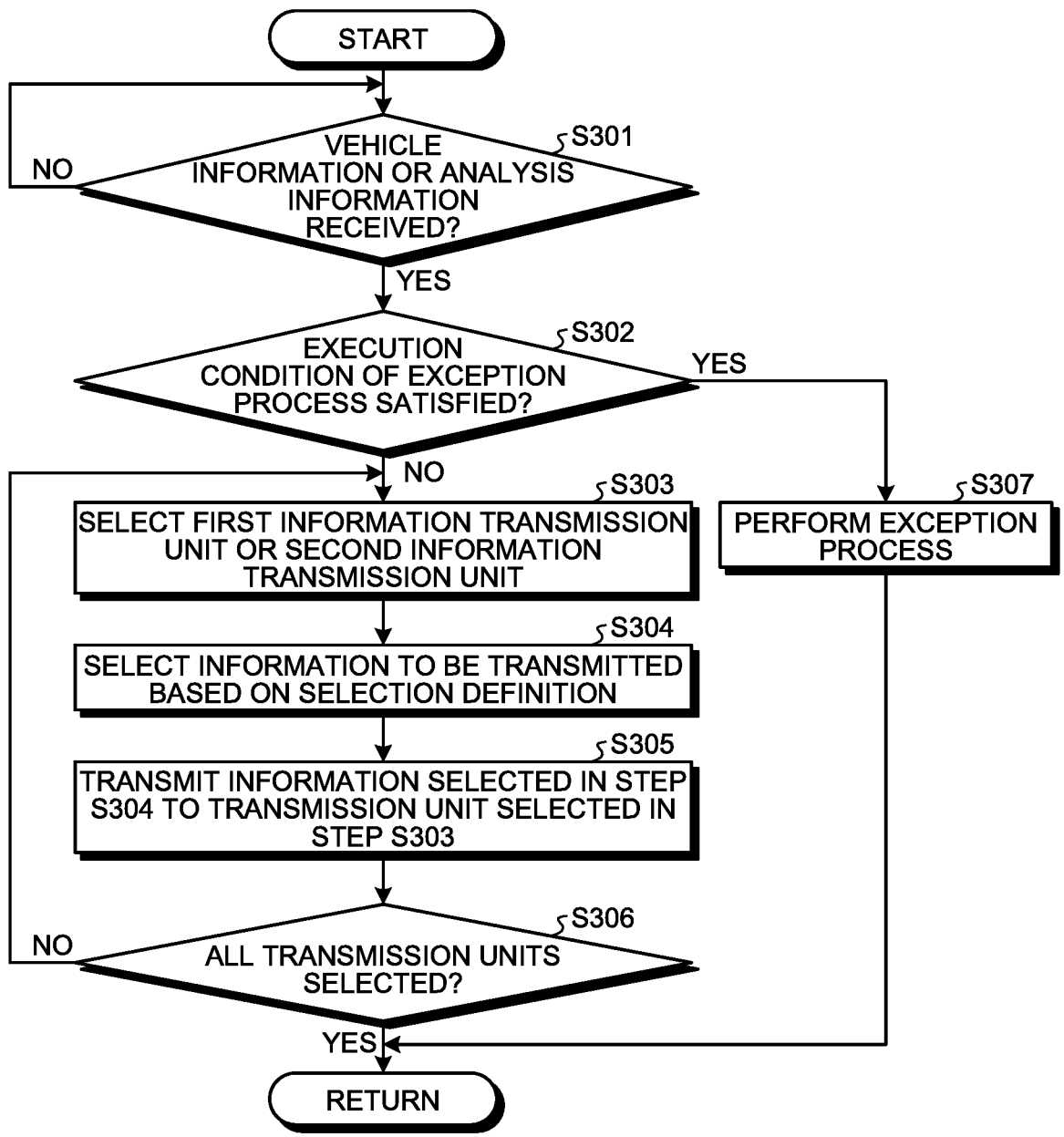
FIG. 15 is a diagram illustrating an example of exception process execution conditions stored in an exception process execution condition storage unit 122e according to the third embodiment.
FIG. 16 is a flowchart illustrating an example of processing by an information management device 100 according to the third embodiment.

The exception process execution condition storage unit 122e stores an exception process execution condition for performing the exception process performed by the information selection unit 123c when the vehicle information including the error information and the priority information and the analysis information are received. FIG. 15 is a diagram illustrating an example of the exception process execution condition stored in the exception process execution condition storage unit 122e according to the third embodiment. As illustrated in FIG. 15, the exception process execution condition storage unit 122e stores the exception process content of "perform selection according to the selection definition when receiving the vehicle information or the analysis information including the error information or the priority information" in association with the exception process execution condition of "receive the vehicle information or the analysis information including the error information or the priority information". The exception process execution condition and the exception process content illustrated in FIG. 15 are an example, and the present invention is not limited to those illustrated in FIG. 15. The administrator of the information management device 100 can create any exception process execution condition and any exception process content and set them in the exception process execution condition storage unit 122e.

The information collection unit 123a basically has the same function as the information collection unit 103a described in the first embodiment. The information collection unit 123a can collect vehicle information. The vehicle information collected by the information collection unit 123a includes the error information and the priority information.

The information analysis unit 123b basically has the same function as the information analysis unit 103b described in the first embodiment. The information analysis unit 123b can generate analysis information by analyzing the vehicle information collected by the information collection unit 123a. Unlike the first embodiment, when the vehicle information is analyzed, and the specific operation state of the dump truck 2 is recognized in the generated analysis information, the information analysis unit 123b assigns the priority information to the generated analysis information. When the vehicle information is analyzed, and the malfunctioning state of the dump truck 2 is recognized in the generated analysis information, the information analysis unit 123b assigns the error information to the generated analysis information. As described above, the specific operation state is not a malfunctioning state such as a failure of the dump truck 2, but is an unintended operation state of the dump truck 2, so that the error information is assigned to the analysis information corresponding to the malfunctioning state of the dump truck 2, but the priority information is not assigned. The priority information may have a weight according to the importance of the analysis information. In this case, when the specific operation state of the dump truck 2 is recognized in the generated analysis information, the information analysis unit 123b can change the priority information assigned to the analysis information depending on the importance of the analysis information corresponding to the specific operation state. In the analysis information illustrated in FIG. 13 as an example, a method is exemplified in which "P1" is assigned as the priority information when the analysis information of the analysis information ID "D101" is of high importance as the analysis information corresponding to the specific operation state, "P2" is assigned as the priority information when the analysis information of the analysis information ID "D002" is of medium importance as the analysis information corresponding to the specific operation state, and "P3" is assigned the priority information when the analysis information of the analysis information ID "D111" is of low importance as the analysis information corresponding to the specific operation state. The method of giving the priority information to the analysis information corresponding to the specific operation state by the information analysis unit 123b can be arbitrarily set by the administrator of the information management device 100.

The information selection unit 123c basically has the same function as the information selection unit 103c described in the first embodiment. That is, the information selection unit 123c can perform, based on the selection definition stored in the selection definition storage unit 122c, a process of selecting the information to be transmitted to each of the first information transmission unit 123d and the second information transmission unit 123e. The information selected by the information selection unit 123c as the information to be transmitted to each of the first information transmission unit 123d and the second information transmission unit 123e includes at least one of the vehicle information and the analysis information.

On the other hand, when the exception process execution condition stored in the exception process execution condition storage unit 122e is satisfied, the information selection unit 123c performs the exception process of selecting the information based on the selection definition corresponding to the exception process.

Specifically, the information selection unit 123c determines whether the vehicle information or the analysis information has been received. Upon receiving the vehicle information or the analysis information, the information selection unit 123c acquires the exception process execution condition from the exception process execution condition storage unit 122e and determines whether the exception process execution condition is satisfied. For example, when the received vehicle information or the received analysis information includes any of the error information or the priority information, the information selection unit 123c determines that the exception process execution condition is satisfied.

When the exception process execution condition is satisfied, the information selection unit 123c performs the exception process associated with the exception process execution condition. The information selection unit 123c selects, for example, all of the vehicle information and the analysis information including the error information and the priority information based on the selection definition corresponding to the exception process.

The information selection unit 123c transmits all of the vehicle information and the analysis information including the error information and the priority information to the first information transmission unit 123d and the second information transmission unit 123e by the communication system corresponding to each of the first information transmission unit 123d and the second information transmission unit 123e according to the communication system stored in the connection system and communication system storage unit 122d.

On the other hand, when the exception process execution condition is not satisfied, the information selection unit 123c performs the same process as in the first embodiment. That is, the information selection unit 123c acquires a selection definition different from the selection definition corresponding to the exception process from among the selection definitions stored in the selection definition storage unit 122c. Then, the information selection unit 123c selects the first information transmission unit 123d or the second information transmission unit 123e. The information selection unit 103c selects the information to be transmitted to each of the first information transmission unit 123d and the second information transmission unit 123e based on the selection definition. The information selection unit 123c selects the vehicle information and the analysis information for which "transmission allowed" is set in the propriety of transmission of the selection definition as information to be transmitted to each of the first information transmission unit 123d and the second information transmission unit 123e. The information selection unit 123c performs a conversion from the in-vehicle communication system to the communication system corresponding to each of the first information transmission unit 123d and the second information transmission unit 123e according to the communication system stored in the connection system and communication system storage unit 122d, and transmits the selected information to the first information transmission unit 123d and the second information transmission unit 123e based on the selection definition.

The first information transmission unit 123d has the same function as the first information transmission unit 103d described in the first embodiment, and transmits the information acquired from the information selection unit 123c to the communication device 25. The second information transmission unit 123e has the same function as the second information transmission unit 103e described in the first embodiment, and transmits the information acquired from the information selection unit 123c to the communication device 25.

FIG. 16 is a flowchart illustrating an example of processing by the information management device 100 according to the third embodiment. The process illustrated in FIG. 16 may be repeatedly performed while the information management device 100 is operating, for example. The process illustrated in FIG. 16 differs from the process performed by the information management device 100 according to the first embodiment in the determination procedure of step S302 and the processing procedure of step S307.

As illustrated in FIG. 16, the information selection unit 123c determines whether the vehicle information or the analysis information has been acquired (step S301). When the vehicle information or the analysis information has not been acquired as a result of the determination (step S301, No), the information selection unit 123c repeats the determination of step S301.

When the vehicle information or the analysis information is received as a result of the determination (step S301, Yes), the information selection unit 123c determines whether the execution condition of the exception process is satisfied (step S302). That is, the information selection unit 123c determines whether the vehicle information or the analysis information received in step S301 includes the error information or the priority information.

When the execution condition of the exception process is not satisfied as a result of the determination (step S302, No), the information selection unit 123c selects the first information transmission unit 123d or the second information transmission unit 123e (step S303).

Then, the information selection unit 123c selects, based on the selection definition acquired from the selection definition storage unit 122c, the information to be transmitted to the first information transmission unit 123d or the second information transmission unit 123e selected in step S302 (step S304).

Then, the information selection unit 123c transmits the information selected in step S304 to the transmission unit selected in step S303, that is, the first information transmission unit 123d and the second information transmission unit 123e (step S305).

Then, the information selection unit 123c determines whether all the transmission units, that is, the first information transmission unit 103d and the second information transmission unit 103e are selected (step S306).

When all the transmission units are selected as a result of the determination (step 306, Yes), the information selection unit 123c returns the process to the determination in step S301 described above.

When not all the transmission units are selected as a result of the determination (step S306, No), the information selection unit 123c returns the process to the procedure of the above step S303. That is, returning to step S302 described above, the information selection unit 123c selects a transmission unit that is not selected from among the first information transmission unit 123d and the second information transmission unit 123e, and performs the process after step S303.

In step S302 described above, when the exception process execution condition is satisfied as a result of the determination (step S302, Yes), the information selection unit 123c performs the exception process (step S307) and returns the process to the determination in step S301 described above. That is, the information selection unit 123c acquires the selection definition corresponding to the exception process from the selection definition storage unit 122c, and selects, based on the selection definition corresponding to the acquired exception process, the information to be transmitted to each of the first information transmission unit 123d and the second information transmission unit 123e. For example, as a result of complying with the selection definition corresponding to the exception process, the information selection unit 123c transmits, to the first information transmission unit 123d and the second information transmission unit 123e, all of the vehicle information or the analysis information including the error information or the priority information received in step S301.

As mentioned above, according to the third embodiment, when the exception process execution condition stored in the exception process execution condition storage unit 122e is satisfied, the information management device 100 can perform, based on the selection definition corresponding to exception process, the exception process of performing selection of the information. Therefore, the information management device 100 can realize the flexible entering of information according to the operating status of the dump truck 2. Further, the flag information associated with the vehicle information or the analysis information may be arbitrarily associated regardless of the error information or the priority information.

The process by the information management device 100 described as the third embodiment can be similarly applied to the second embodiment.

Other Embodiments (1) External Device

Figure 17:
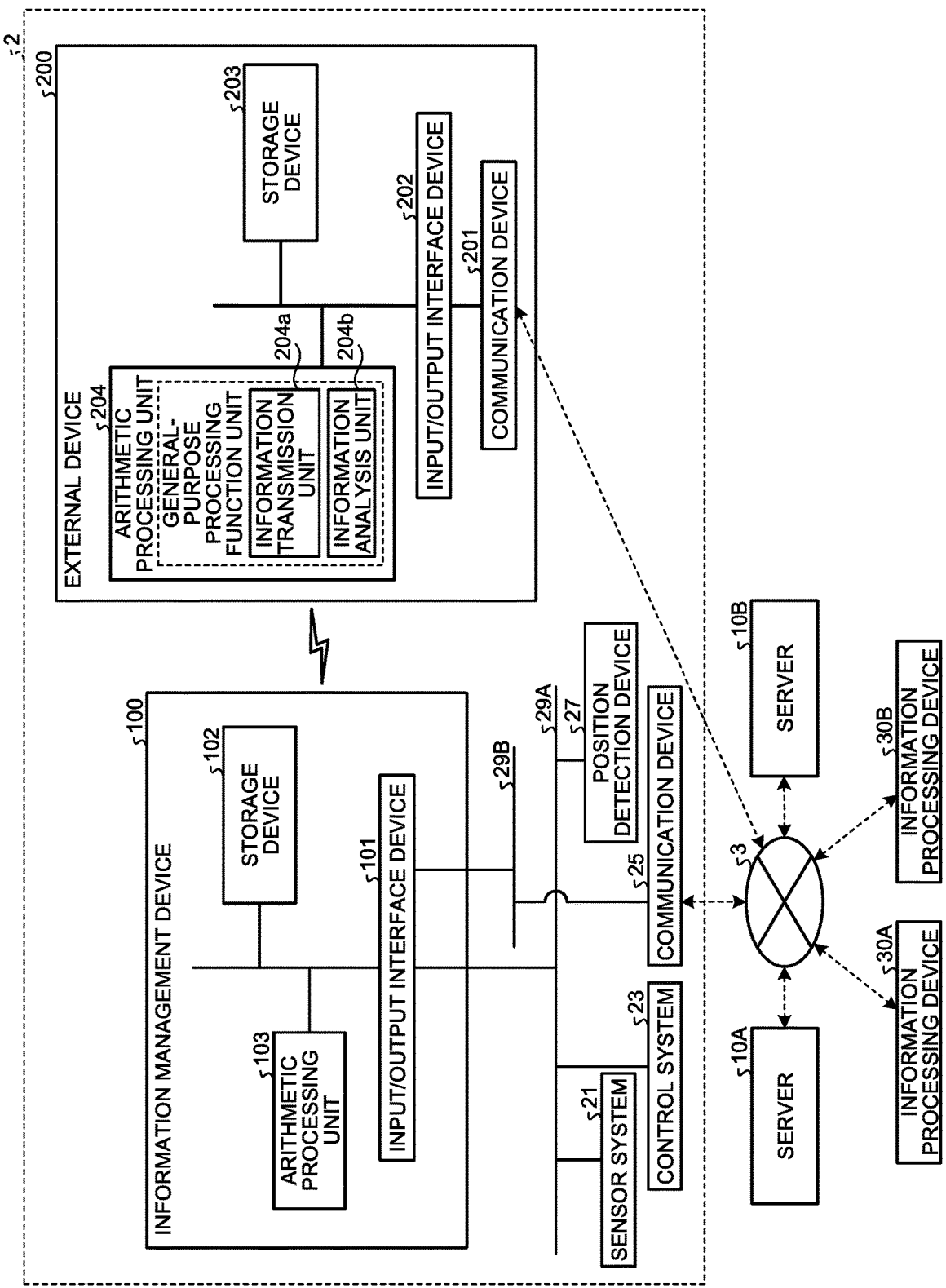
FIG. 17 is a diagram illustrating a configuration example of a dump truck according to another embodiment.

In the above embodiment, the example in which the information management device 100 having a general-purpose processing function unit such as the second information transmission unit 103e, 113e, 123e, or the second information analysis unit 113f is mounted on the dump truck 2 is described, but the present invention is not limited to this example. The general-purpose processing function unit such as the second information transmission unit 103e, 113e, 123e, or the second information analysis unit 113f may not be installed in the information management device 100. FIG. 17 is a diagram illustrating a configuration example of a dump truck according to another embodiment.

As illustrated in FIG. 17, the dump truck 2 may include an external device 200 in which an information transmission unit 204a having a function corresponding to the second information transmission unit 103e, 113e, 123e, or the like, and an information analysis unit 204b having a function corresponding to the second information analysis unit 113f are installed. The external device 200 includes a communication device 201, an input/output interface device 202, a storage device 203, and an arithmetic processing unit 204. The external device 200 can perform data communication with the information management device 100, the server 10A, the server 10B, and the like via the communication network 3. Then, the external device 200 can transmit the vehicle information and the analysis information received from the information management device 100 to the server 10A, the server 10B, and the like via the communication network 3. The external device 200 can generate analysis information by analyzing the vehicle information received from the information management device 100, and can transmit the generated analysis information to the information management device 100.

The external device 200 may be physically connected to the information management device 100 in a data communicable state, or may be wirelessly connected. Data communication between the external device 200 and the information management device 100 is performed based on, for example, the connection system and the communication system set in a connection system and communication system storage unit 106d illustrated in FIG. 5. The information management device 100 can absorb, for example, based on the connection system and the communication system stored in the connection system and communication system storage unit 102d illustrated in FIG. 5, the difference in connection system and the communication system between the external device 200 implemented by external connection, and can transmit the vehicle information and the analysis information. The external device 200 may be detachably attached to the dump truck 2. The information management device 100 may also be detachably attached to the dump truck 2.

(2) Information Management Method

The information management device 100 described in the above embodiment implements the following information management method.

That is, in the information management device 100, an information management method including a step of collecting vehicle information, (For example, a function provided by the information collection unit 103a illustrated in FIG. 3), a step of analyzing the vehicle information to generate analysis information (For example, a function provided by the information analysis unit 103b illustrated in FIG. 3), a step of storing a selection definition that defines a relationship between transmission propriety information indicating whether it is allowed to transmit the vehicle information and the analysis information to a general-purpose processing function unit and a transmission destination (For example, a function provided by the selection definition storage unit 102c illustrated in FIG. 3), and a step of selecting information to be transmitted to the general-purpose processing function unit based on a selection definition (For example, a function provided by the information selection unit 103c illustrated in FIG. 3) is provided.

The processing based on the various functions of the information management device 100 described in the above embodiment may be realized by a wired logic in which a plurality of processing circuits for realizing each of the processes based on the various functions provided by the information management device 100 are linked. For example, a circuit such as an application specific integrated circuit (ASIC) or a field programmable gate array (FPGA) can be applied to the processing circuit for realizing the processing based on the various functions of the information management device 100 described in the above embodiment.

The foregoing description has been made in terms of characteristic embodiments for the purpose of fully and clearly disclosing the claimed technology in the claims of the present application. However, the technology according to the claims described in the claims should not be limited to the above-mentioned embodiments, but should be embodied by all the modifications and the alternative constructions that can be made by those skilled in the art within the scope of the basic matters illustrated in the present application.

REFERENCE SIGNS LIST 1 information management system
2 dump truck
3 communication network
4 work site
10A, 10B server
21 sensor system
23 control system
25 communication device
27 position detection device
30A, 30B information processing device
100 information management device
101 input/output interface device
102 storage device
102a, 112a, 122a vehicle information storage unit
102b, 112b, 122b analysis information storage unit
102c, 112c, 122c selection definition storage unit
102d, 112d, 122d connection system and communication system storage unit
122e exception process execution condition storage unit
103 arithmetic processing unit
103a, 113a, 123a information collection unit
103b, 113b, 123b information analysis unit, first information analysis unit, information analysis unit
103c, 113c, 123c information selection unit
103d, 113d, 123d first information transmission unit
103e, 113e, 123e second information transmission unit
113f second information analysis unit

The invention claimed is:

1. An information management device of a work machine, the information management device comprising:
an information collection processing unit that collects vehicle information of the work machine;
an information analysis processing unit that analyzes the vehicle information to generate analysis information;
a selection definition storage processing unit that stores a selection definition that defines transmission propriety information indicating whether it is allowed to transmit the vehicle information and the analysis information to a first information transmission unit and/or a general-purpose processing function unit containing a second information transmission unit; and
an information selection processing unit that selects, based on the selection definition, information to be transmitted to the first information transmission unit and/or the general-purpose processing function unit containing the second information transmission unit, which is a general-purpose transmission function unit;
wherein the information selection processing unit can change the information to be transmitted according to an information transmission destination and further the first information transmission unit and the second information transmission unit can create the selection definition, whereby the transmission of the vehicle information and the analysis information can be managed such that the information management device can manage the information to the general-purpose transmission function unit in response to a request from an administrator of the information management device.

2. The information management device of the work machine according to claim 1, wherein the general-purpose processing function unit includes at least one of a general-purpose transmission function unit that receives at least one of the vehicle information and the analysis information according to a set connection system or a set communication system, and a general-purpose analysis function unit that analyzes the vehicle information and the analysis information according to a predetermined analysis method.

3. The information management device of the work machine according to claim 2, wherein the selection definition includes a relationship between transmission propriety information indicating whether it is allowed to transmit analysis information, of the vehicle information, which is generated by the general-purpose analysis function unit to a transmission destination, and the transmission destination, and the information selection unit selects, based on the selection definition, information to be transmitted to the general-purpose transmission function unit from among the vehicle information collected in the information collection unit, the analysis information generated by the information analysis unit, and the analysis information generated by the general-purpose analysis function unit.

4. The information management device of the work machine according to claim 2, wherein the selection definition is preset according to a degree of a risk that communication content is intercepted when the general-purpose transmission function unit performs communication, or a right assigned in advance to each user who acquires the vehicle information and the analysis information.

5. The information management device of the work machine according to claim 1, wherein the selection definition includes a first selection definition corresponding to a case where it is determined that the vehicle information or the analysis information includes any of information corresponding to a malfunctioning state of the work machine or information corresponding to a specific operation state of the work machine, and a second selection definition corresponding to a case where it is determined that the vehicle information or the analysis information includes none of information corresponding to the malfunctioning state of the work machine or information corresponding to the specific operation state of the work machine, and the information selection unit performs, based on the first selection definition, selection of the vehicle information and the analysis information including information corresponding to the malfunctioning state of the work machine or information corresponding to the specific operation state of the work machine when it is determined that the vehicle information and the analysis information include any of information corresponding to the malfunctioning state of the work machine or information corresponding to the specific operation state of the work machine, and performs, based on the second selection definition, selection of the vehicle information and the analysis information when it is determined that the vehicle information and the analysis information include none of information corresponding to the malfunctioning state of the work machine and information corresponding to the specific operation state of the work machine.

6. An information management method of work machine, the method comprising:

collecting vehicle information of the work machine;

analyzing the vehicle information to generate analysis information; and based on a selection definition that defines transmission propriety information indicating whether it is allowed to transmit the vehicle information and the analysis information to a first information transmission unit and/or a general-purpose processing function unit containing a second information transmission unit, which is a general-purpose transmission function unit, selecting information to be transmitted to the first information transmission unit and/or the general-purpose processing function unit connected to an information management device containing the second information transmission unit;

wherein the first information transmission unit and the second information transmission unit can create the selection definition, whereby the transmission of the vehicle information and the analysis information can be managed such that the information management method can manage the information to the general-purpose transmission function unit in response to a request from an administrator of the information management method.

7. An information management system of a work machine, the system comprising:

an information collection processing unit that collects vehicle information of the work machine;

an information analysis processing unit that analyzes the vehicle information to generate analysis information;

a selection definition storage processing unit that stores a selection definition that defines transmission propriety information indicating whether it is allowed to transmit the vehicle information and the analysis information to a first information transmission unit and/or a general-purpose processing function unit containing a second information transmission unit, which is a general-purpose transmission function unit; and an information selection processing unit that selects, based on the selection definition, information to be transmitted to the first information transmission unit and/or the general-purpose processing function unit containing the second information transmission unit;

wherein the information selection processing unit can change the information to be transmitted according to an information transmission destination and further the first information transmission unit and the second information transmission unit can create the selection definition, whereby the transmission of the vehicle information and the analysis information can be managed such that the information management system can manage the information to the general-purpose transmission function unit in response to a request from an administrator of the information management system.

8. The information management device of the work machine according to claim 1, further comprising a plurality of the general-purpose processing function units.

\* \* \* \* \*